US012627804B2

(12) United States Patent
Wu et al.

(10) Patent No.: US 12,627,804 B2
(45) Date of Patent: May 12, 2026

(54) METHOD, APPARATUS, AND MEDIUM FOR VISUAL DATA PROCESSING

(71) Applicants:Beijing Bytedance Network Technology Co., Ltd., Beijing (CN); Bytedance Inc., Los Angeles, CA (US)

(72) Inventors: Yaojun Wu, Beijing (CN); Semih Esenlik, Los Angeles, CA (US); Zhaobin Zhang, Los Angeles, CA (US); Yue Li, Los Angeles, CA (US); Kai Zhang, Los Angeles, CA (US); Li Zhang, Los Angeles, CA (US)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 18/828,890

(22) Filed: Sep. 9, 2024

(65) Prior Publication Data

US 2025/0030857 A1      Jan. 23, 2025

Related U.S. Application Data

(63) Continuation of application No. PCT/CN2023/080423, filed on Mar. 9, 2023.

(30) Foreign Application Priority Data

Mar. 9, 2023    (WO) ................ PCT/CN2023/080423

(51) Int. Cl.
*H04N 19/126*      (2014.01)
*H04N 19/42*      (2014.01)

(52) U.S. Cl.
CPC .......... *H04N 19/126* (2014.11); *H04N 19/42* (2014.11)

(58) Field of Classification Search
CPC ............................ H04N 19/42; H04N 19/126
See application file for complete search history.

(56) References Cited

U.S. PATENT DOCUMENTS

2021/0329267 A1* 10/2021 Kianfar ................ H04N 19/124

FOREIGN PATENT DOCUMENTS

| CN | 110637460 A | 12/2019 |
| CN | 111696149 A | 9/2020 |
| WO | 2021050007 A1 | 3/2021 |
| WO | 2021177652 A1 | 9/2021 |

(Continued)

OTHER PUBLICATIONS

International Search Report for PCT/CN2023/080423, mailed Jun. 5, 2023, 4 pages.

(Continued)

*Primary Examiner* — On S Mung
(74) *Attorney, Agent, or Firm* — Astute IP Law Group

(57) ABSTRACT

Embodiments of the present disclosure provide a solution for visual data processing. A method for visual data processing is proposed. The method comprises: performing, for a conversion between visual data and a bitstream of the visual data, a quantization process on a dataset comprising at least one of: input visual data of a neural network model used for the conversion, or a parameter of the neural network model; and performing the conversion based on the quantization process.

18 Claims, 12 Drawing Sheets

100 ⌐

(56)　　　　　　　References Cited

FOREIGN PATENT DOCUMENTS

WO　　　　2021211270 A1　　10/2021

OTHER PUBLICATIONS

Extended European Search Report for European Patent Application No. 23766078.2, mailed on Dec. 12, 2025, 10 pages.
He et al., "Post-Training Quantization for Cross Platform Learned Image Compression", arXiv:2202.07513v1 [eess. IV], Feb. 15, 2022, 11 pages.
Nagel et al., "A White Paper on Neural Network Quantization", arXiv:2106.08295v1 [cs.LG], Jun. 15, 2021, 27 pages.
Sun et al., "End-To-End Learned Image Compression With Fixed Point Weight Quantization", IEEE, ICIP, Oct. 25, 2020, 5 pages.

* cited by examiner $$\min_{g_a, g_s, q} D(z, \hat{z}) + \lambda R(q(y))$$

1100

1110

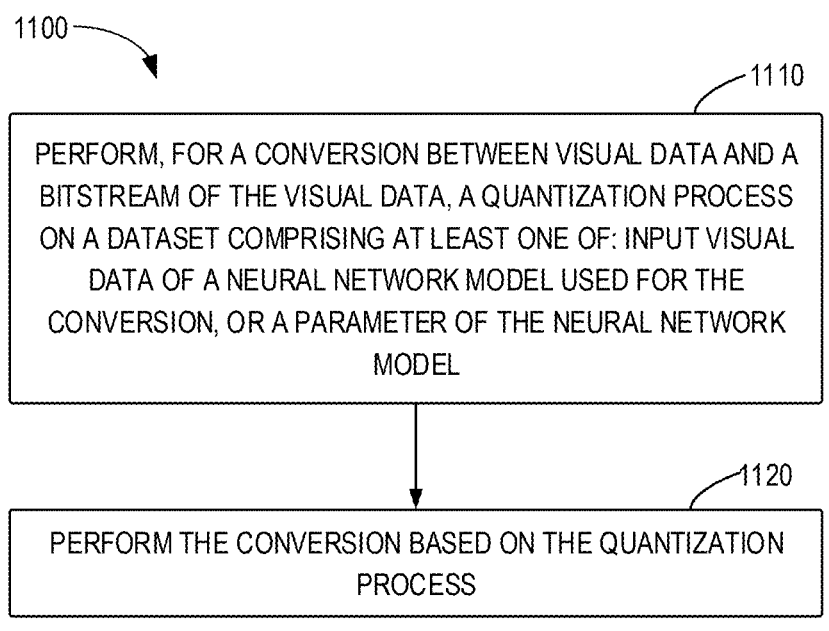

PERFORM, FOR A CONVERSION BETWEEN VISUAL DATA AND A BITSTREAM OF THE VISUAL DATA, A QUANTIZATION PROCESS ON A DATASET COMPRISING AT LEAST ONE OF: INPUT VISUAL DATA OF A NEURAL NETWORK MODEL USED FOR THE CONVERSION, OR A PARAMETER OF THE NEURAL NETWORK MODEL

1120

PERFORM THE CONVERSION BASED ON THE QUANTIZATION PROCESS

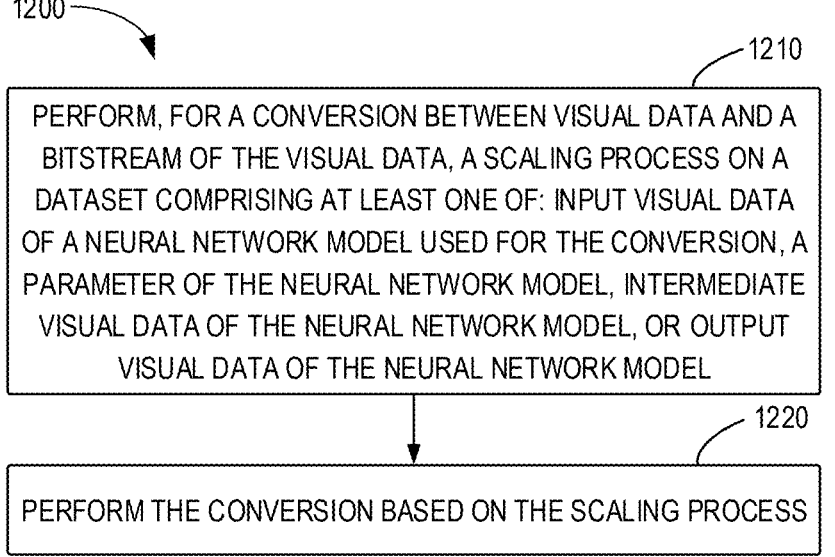

PERFORM, FOR A CONVERSION BETWEEN VISUAL DATA AND A BITSTREAM OF THE VISUAL DATA, A SCALING PROCESS ON A DATASET COMPRISING AT LEAST ONE OF: INPUT VISUAL DATA OF A NEURAL NETWORK MODEL USED FOR THE CONVERSION, A PARAMETER OF THE NEURAL NETWORK MODEL, INTERMEDIATE VISUAL DATA OF THE NEURAL NETWORK MODEL, OR OUTPUT VISUAL DATA OF THE NEURAL NETWORK MODEL

1220

PERFORM THE CONVERSION BASED ON THE SCALING PROCESS

Fig. 12

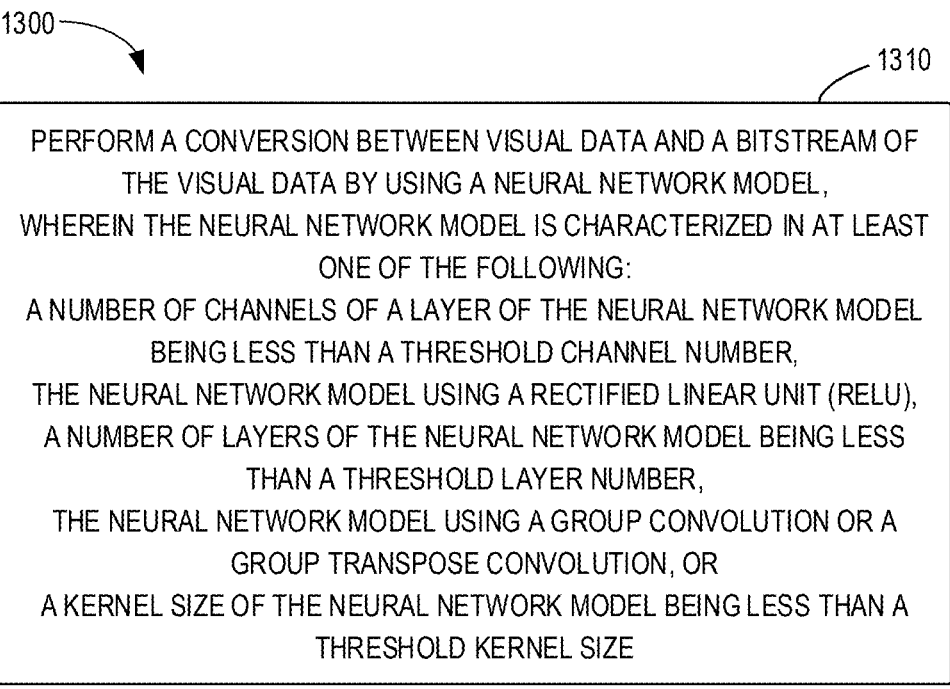

1300

1310

PERFORM A CONVERSION BETWEEN VISUAL DATA AND A BITSTREAM OF THE VISUAL DATA BY USING A NEURAL NETWORK MODEL,
WHEREIN THE NEURAL NETWORK MODEL IS CHARACTERIZED IN AT LEAST ONE OF THE FOLLOWING:
A NUMBER OF CHANNELS OF A LAYER OF THE NEURAL NETWORK MODEL BEING LESS THAN A THRESHOLD CHANNEL NUMBER,
THE NEURAL NETWORK MODEL USING A RECTIFIED LINEAR UNIT (RELU),
A NUMBER OF LAYERS OF THE NEURAL NETWORK MODEL BEING LESS THAN A THRESHOLD LAYER NUMBER,
THE NEURAL NETWORK MODEL USING A GROUP CONVOLUTION OR A GROUP TRANSPOSE CONVOLUTION, OR
A KERNEL SIZE OF THE NEURAL NETWORK MODEL BEING LESS THAN A THRESHOLD KERNEL SIZE

Fig. 13

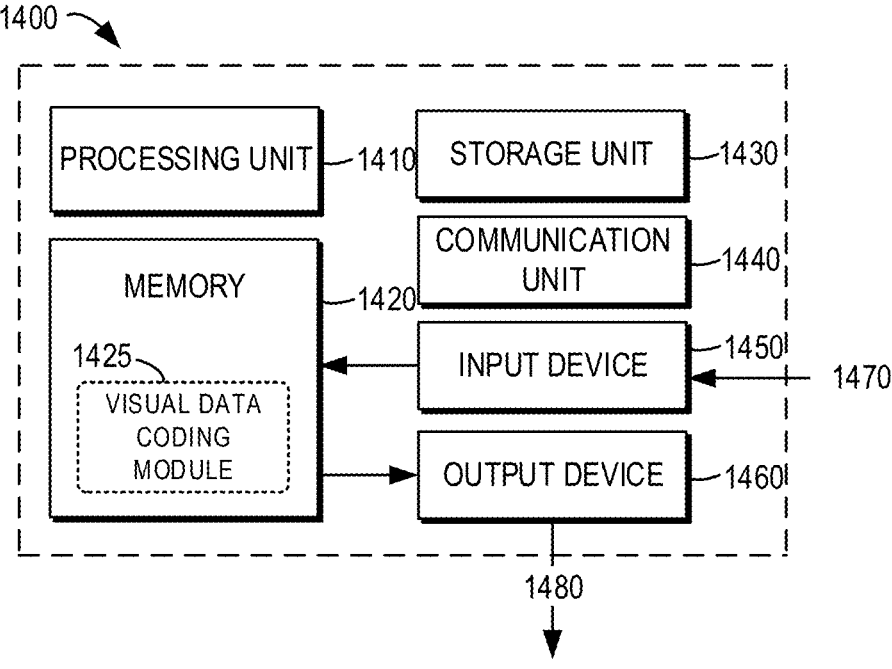

1400

PROCESSING UNIT —1410

STORAGE UNIT —1430

MEMORY —1420

COMMUNICATION UNIT —1440

1425

VISUAL DATA CODING MODULE

INPUT DEVICE —1450

1470

OUTPUT DEVICE —1460

METHOD, APPARATUS, AND MEDIUM FOR VISUAL DATA PROCESSING

CROSS REFERENCE TO RELATED APPLICATIONS

This application is continuation of International Application No. PCT/CN2023/080423, filed on Mar. 9, 2023, which claims priority to Chinese Application No. PCT/CN2022/080028 filed on Mar. 9, 2022. The entire contents of these applications are hereby incorporated by reference in their entireties.

FIELDS

Embodiments of the present disclosure relates generally to visual data processing techniques, and more particularly, to quantization process, a scaling process and a neural network model for visual data processing.

BACKGROUND

Image/video compression is an essential technique to reduce the costs of image/video transmission and storage in a lossless or lossy manner. Image/video compression techniques can be divided into two branches, the classical video coding methods and the neural-network-based video compression methods. Classical video coding schemes adopt transform-based solutions, in which researchers have exploited statistical dependency in the latent variables (e.g., wavelet coefficients) by carefully hand-engineering entropy codes modeling the dependencies in the quantized regime. Neural network-based video compression is in two flavors, neural network-based coding tools and end-to-end neural network-based video compression. The former is embedded into existing classical video codecs as coding tools and only serves as part of the framework, while the latter is a separate framework developed based on neural networks without depending on classical video codecs. Coding efficiency of image/video coding is generally expected to be further improved.

SUMMARY

Embodiments of the present disclosure provide a solution for visual data processing.

In a first aspect, a method for visual data processing is proposed. The method comprises: performing, for a conversion between visual data and a bitstream of the visual data, a quantization process on a dataset comprising at least one of: input visual data of a neural network model used for the conversion, or a parameter of the neural network model; and performing the conversion based on the quantization process.

The method in accordance with the first aspect of the present disclosure converts data such as visual data in floating-point to data in fix-point. In this way, the neural network model can perform fix-point calculation, and thus can provide an unchanged precision on different devices. Thus, coding efficiency and coding effectiveness can be improved.

In a second aspect, another method for visual data processing is proposed. The method comprises: performing, for a conversion between visual data and a bitstream of the visual data, a scaling process on a dataset comprising at least one of: input visual data of a neural network model used for the conversion, a parameter of the neural network model, intermediate visual data of the neural network model, or output visual data of the neural network model; and performing the conversion based on the scaling process.

By performing the scaling process in accordance with the second aspect of the present disclosure, overflow issues occurring during the multiplication and accumulation of convolution may be avoided. Thus, the quantization loss can be reduced, and coding efficiency and coding effectiveness can be improved.

In a third aspect, another method for visual data processing is proposed. The method comprises: performing a conversion between visual data and a bitstream of the visual data by using a neural network model, wherein the neural network model is characterized in at least one of the following: a number of channels of a layer of the neural network model being less than a threshold channel number, the neural network model using a rectified linear unit (ReLU), a number of layers of the neural network model being less than a threshold layer number, the neural network model using a group convolution or a group transpose convolution, or a kernel size of the neural network model being less than a threshold kernel size.

According to the method in accordance with the third aspect of the present disclosure, an interoperability-friendly model can be used in visual data coding. In this way, devices interoperability can be improved, and thus coding efficiency and coding effectiveness can be improved.

In a fourth aspect, an apparatus for visual data processing is proposed. The apparatus comprises a processor and a non-transitory memory with instructions thereon. The instructions upon execution by the processor, cause the processor to perform a method in accordance with the first aspect, the second aspect, or the third aspect of the present disclosure.

In a fifth aspect, a non-transitory computer-readable storage medium is proposed. The non-transitory computer-readable storage medium stores instructions that cause a processor to perform a method in accordance with the first aspect, the second aspect, or the third of the present disclosure.

In a sixth aspect, another non-transitory computer-readable recording medium is proposed. The non-transitory computer-readable recording medium stores a bitstream of visual data which is generated by a method performed by an apparatus for visual data processing. The method comprises: performing a quantization process on a dataset comprising at least one of: input visual data of a neural network model used for generating the bitstream, or a parameter of the neural network model; and generating the bitstream based on the quantization process.

In a seventh aspect, a method for storing a bitstream of visual data is proposed. The method comprises: performing a quantization process on a dataset comprising at least one of: input visual data of a neural network model used for generating the bitstream, or a parameter of the neural network model; generating the bitstream based on the quantization process; and storing the bitstream in a non-transitory computer-readable recording medium.

In an eighth aspect, another non-transitory computer-readable recording medium is proposed. The non-transitory computer-readable recording medium stores a bitstream of visual data which is generated by a method performed by an apparatus for visual data processing. The method comprises: performing a scaling process on a dataset comprising at least one of: input visual data of a neural network model used for generating the bitstream, a parameter of the neural network model, intermediate visual data of the neural network model, or output visual data of the neural network model; and generating the bitstream based on the scaling process.

In a ninth aspect, a method for storing a bitstream of visual data is proposed. The method comprises: performing a scaling process on a dataset comprising at least one of: input visual data of a neural network model used for generating the bitstream, a parameter of the neural network model, intermediate visual data of the neural network model, or output visual data of the neural network model; generating the bitstream based on the scaling process; and storing the bitstream in a non-transitory computer-readable recording medium.

In a tenth aspect, another non-transitory computer-readable recording medium is proposed. The non-transitory computer-readable recording medium stores a bitstream of visual data which is generated by a method performed by an apparatus for visual data processing. The method comprises: generating the bitstream by using a neural network model, wherein the neural network model is characterized in at least one of the following: a number of channels of a layer of the neural network model being less than a threshold channel number, the neural network model using a rectified linear unit (ReLU), a number of layers of the neural network model being less than a threshold layer number, the neural network model using a group convolution or a group transpose convolution, or a kernel size of the neural network model being less than a threshold kernel size.

In an eleventh aspect, a method for storing a bitstream of visual data is proposed. The method comprises: generating the bitstream by using a neural network model; and storing the bitstream in a non-transitory computer-readable recording medium wherein the neural network model is characterized in at least one of the following: a number of channels of a layer of the neural network model being less than a threshold channel number, the neural network model using a rectified linear unit (ReLU), a number of layers of the neural network model being less than a threshold layer number, the neural network model using a group convolution or a group transpose convolution, or a kernel size of the neural network model being less than a threshold kernel size.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Through the following detailed description with reference to the accompanying drawings, the above and other objectives, features, and advantages of example embodiments of the present disclosure will become more apparent. In the example embodiments of the present disclosure, the same reference numerals usually refer to the same components.

4

Figure 7:
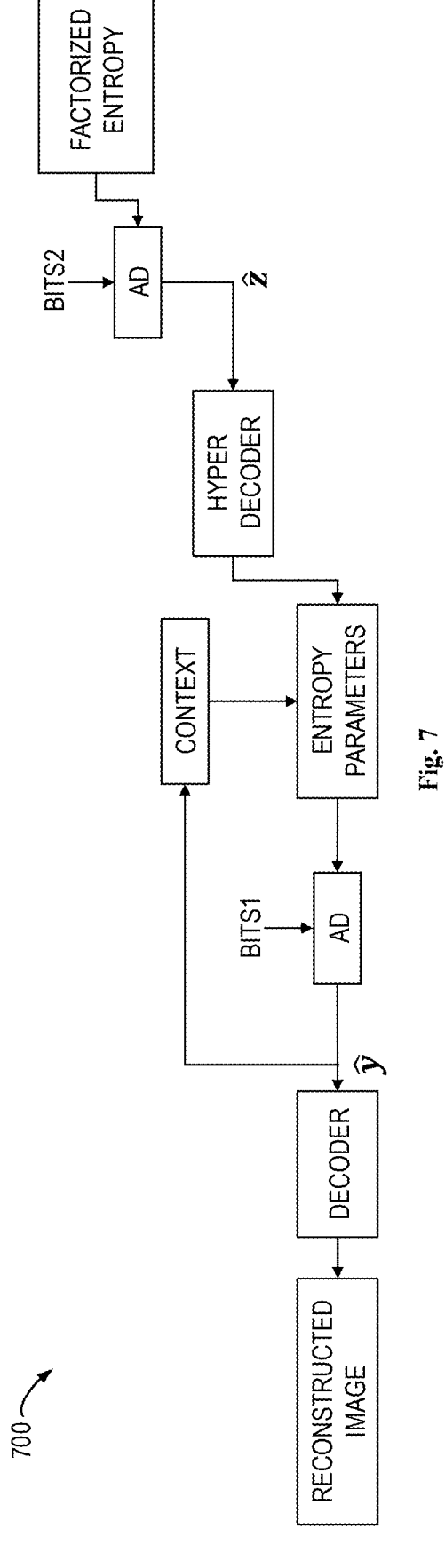
Figure 8A:
Figure 8B:
Figure 9:
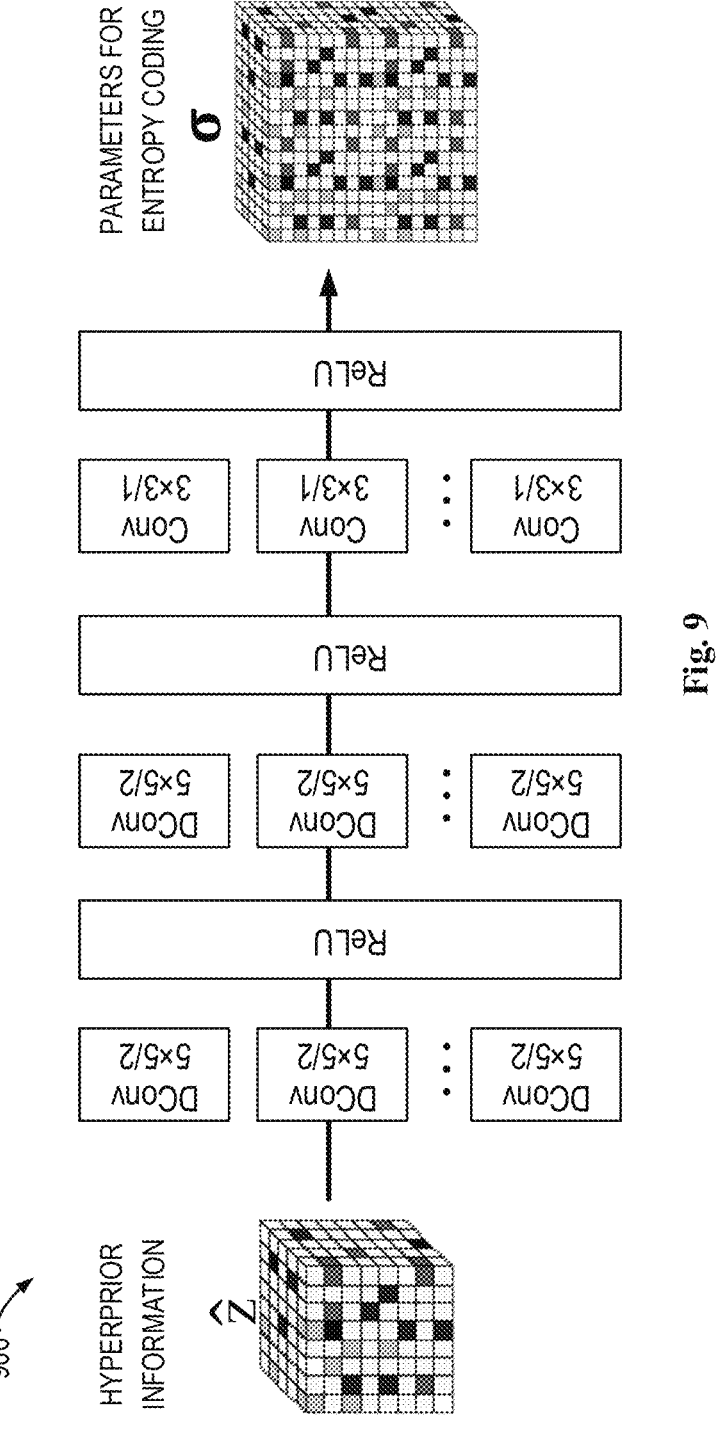
Figure 10:
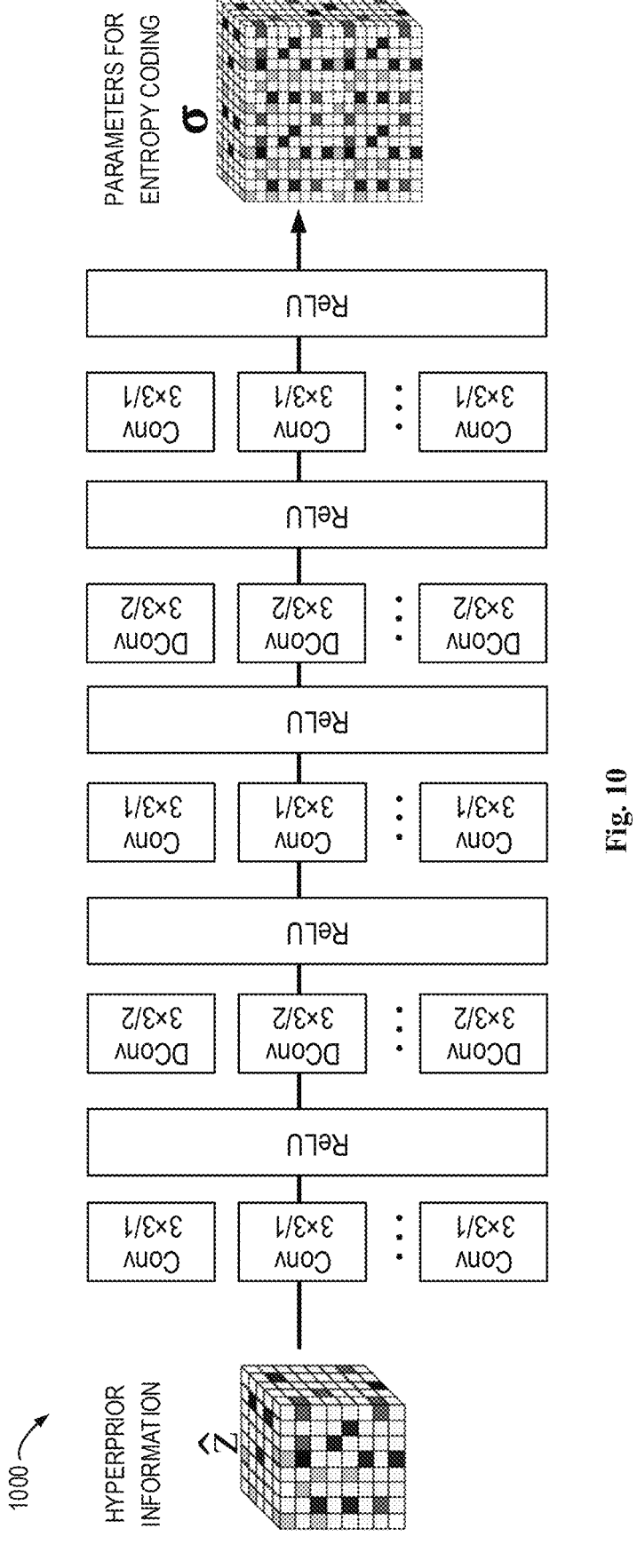

FIG. 7 illustrates a decoding process of the combined model;

FIG. 8A and FIG. 8B illustrate examples of the undecodable results on different devices;

FIG. 9 illustrates an example of the device interoperability friendly design in hyperprior network in accordance with embodiments of the present disclosure;

FIG. 10 illustrates another example of the device interoperability friendly design in hyperprior network in accordance with embodiments of the present disclosure;

FIG. 11 illustrates a flowchart of a method for visual data processing in accordance with embodiments of the present disclosure;

FIG. 12 illustrates a flowchart of another method for visual data processing in accordance with embodiments of the present disclosure;

FIG. 13 illustrates a flowchart of another method for visual data processing in accordance with embodiments of the present disclosure;

FIG. 14 illustrates a block diagram of a computing device in which various embodiments of the present disclosure can be implemented.

Throughout the drawings, the same or similar reference numerals usually refer to the same or similar elements.

DETAILED DESCRIPTION

Principle of the present disclosure will now be described with reference to some embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

Example Environment

Figure 1:
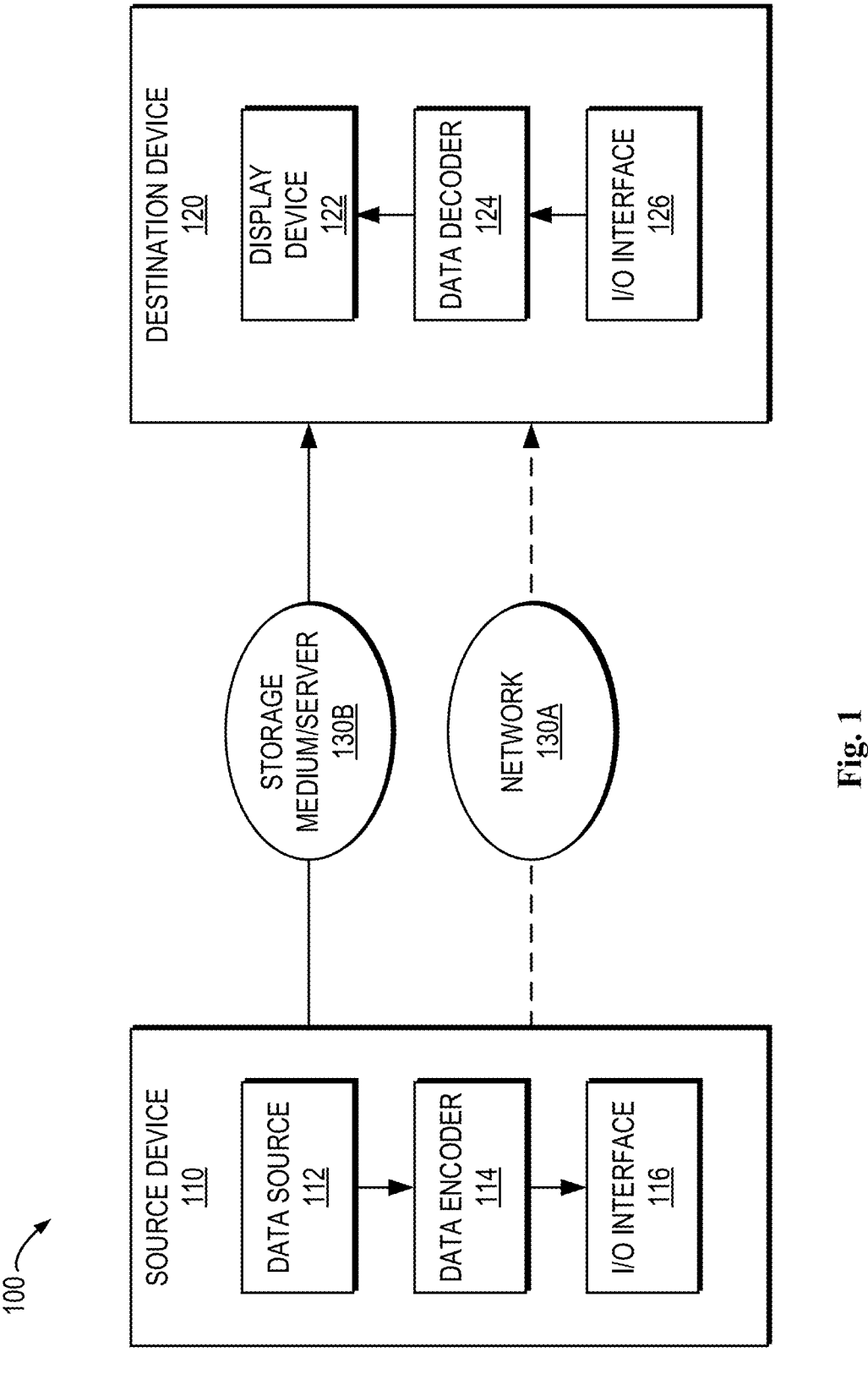
FIG. 1 illustrates a block diagram that illustrates an example visual data coding system, in accordance with some embodiments of the present disclosure.

FIG. 1 is a block diagram that illustrates an example visual data coding system 100 that may utilize the techniques of this disclosure. As shown, the visual data coding system 100 may include a source device 110 and a destination device 120. The source device 110 can be also referred to as a data encoding device or a visual data encoding device, and the destination device 120 can be also referred to as a data decoding device or a visual data decoding device. In operation, the source device 110 can be configured to generate encoded visual data and the destination device 120 can be configured to decode the encoded visual data generated by the source device 110. The source device 110 may include a data source 112, a data encoder 114, and an input/output (I/O) interface 116.

The data source 112 may include a source such as a data capture device. Examples of the data capture device include, but are not limited to, an interface to receive data from a data provider, a computer graphics system for generating data, and/or a combination thereof.

The data may comprise one or more pictures of a video or one or more images. The data encoder 114 encodes the data from the data source 112 to generate a bitstream. The bitstream may include a sequence of bits that form a coded representation of the data. The bitstream may include coded pictures and associated data. The coded picture is a coded representation of a picture. The associated data may include sequence parameter sets, picture parameter sets, and other syntax structures. The I/O interface 116 may include a modulator/demodulator and/or a transmitter. The encoded data may be transmitted directly to destination device 120 via the I/O interface 116 through the network 130A. The encoded data may also be stored onto a storage medium/ server 130B for access by destination device 120.

The destination device 120 may include an I/O interface 126, a data decoder 124, and a display device 122. The I/O interface 126 may include a receiver and/or a modem. The I/O interface 126 may acquire encoded data from the source device 110 or the storage medium/server 130B. The data decoder 124 may decode the encoded data. The display device 122 may display the decoded data to a user. The display device 122 may be integrated with the destination device 120, or may be external to the destination device 120 which is configured to interface with an external display device.

The data encoder 114 and the data decoder 124 may operate according to a data coding standard, such as video coding standard or still picture coding standard and other current and/or further standards.

Some exemplary embodiments of the present disclosure will be described in detailed hereinafter. It should be understood that section headings are used in the present document to facilitate ease of understanding and do not limit the embodiments disclosed in a section to only that section. Furthermore, while certain embodiments are described with reference to Versatile Video Coding or other specific data codecs, the disclosed techniques are applicable to other coding technologies also. Furthermore, while some embodiments describe coding steps in detail, it will be understood that corresponding steps decoding that undo the coding will be implemented by a decoder. Furthermore, the term data processing encompasses data coding or compression, data decoding or decompression and data transcoding in which data are represented from one compressed format into another compressed format or at a different compressed bitrate.

1. Brief Summary

This disclosure is related to end-to-end image compression technologies. Specifically, it is about several technologies to realize device interoperability. It can be used for the entropy coding part to ensure that the reconstruction from entropy coding is consistent on different devices. Besides, it also can be used to realize the device interoperability on learned video compression. Moreover, it may also be applied to the neural network method that is combined with conventional video coding standards to ensure the consistency of the results between the GPU/CPU.

2. Abbreviations

ANN Artificial Neural Network,
CPU Central Processing Unit,
E2E End-to-End,
GPU Graphics Processing Unit,
JPEG Joint Photographic Experts Group,
MPEG Moving Picture Experts Group,
VCEG Video Coding Experts Group,
VTM VVC Test Model,
VVC Versatile Video Coding.

3. Introduction

Image/video compression is an essential technique to reduce the costs of image/video transmission and storage in a lossless or lossy manner. Image/video compression techniques can be divided into two branches, the classical video coding methods and the neural-network-based video compression methods. Classical video coding schemes adopt transform-based solutions, in which researchers have exploited statistical dependency in the latent variables (e.g., DCT or wavelet coefficients) by carefully hand-engineering entropy codes modeling the dependencies in the quantized regime. Neural network-based video compression is in two flavors, neural network-based coding tools and end-to-end neural network-based video compression. The former is embedded into existing classical video codecs as coding tools and only serves as part of the framework, while the latter is a separate framework developed based on neural networks without depending on classical video codecs.

3.1. Conventional Image/Video Compression

Conventional image compression standardizations, such as JPEG, BPG, and VVC, adopt a hybrid framework to compress the input images. In these standardizations, a combination of the prediction, transformation, quantization and entropy coding is utilized to reduce the redundancy inside the image. Under the development over past serval decades, conventional codec improves the compression efficiency by nearly 50% each decade though hand craft design on some modules. A series of classical image coding standards have been developed to accommodate the increasing visual content. The international standardization organizations ISO/IEC has two expert groups namely Joint Photographic Experts Group (JPEG) and Moving Picture Experts Group (MPEG), and ITU-T also has its own Video Coding Experts Group (VCEG) which is for standardization of image coding technology. The influential image coding standards published by these organizations include JPEG, JPEG 2000, H.264/AVC and H.265/HEVC. After H.265/HEVC, the Joint Video Experts Team (JVET) formed by MPEG and VCEG has been working on a new video coding standard Versatile Video Coding (VVC). The first version of VVC was released in July 2020. An average of 50% bitrate reduction is reported by VVC under the same visual quality compared with HEVC.

3.2. Neural Network Based Compression Method

In recent five years, benefit from the great progress achieved by Artificial Neural Network (ANN), learning based solution for media coding create a new branch in image compression. In this branch, ANN will be utilized as a module to replace some functions inside the conventional codec, or fully replace the convention codec through an end-to-end manner. One benefit of such deep networks is believed to be the capacity for processing data with multiple levels of abstraction and converting data into different kinds of representations. Note that these representations are not manually designed; instead, the deep network including the processing layers is learned from massive data using a general machine learning procedure. Deep learning eliminates the necessity of handcrafted representations, and thus is regarded useful especially for processing natively unstructured data, such as acoustic and visual signal, whilst processing such data has been a longstanding difficulty in the artificial intelligence field. Under the development of serval years, ANN based tools has shown some performance gains on conventional codec. As for the end-to-end ANN based image compression, it also achieves superior performance over the latest convention codec, VTM. Nevertheless, it still unmature and has much room to improve the compression performance.

3.3. Learned Image Compression

Existing neural networks for image compression methods can be classified in two categories, i.e., pixel probability modeling and auto-encoder. The former one belongs to the predictive coding strategy, while the latter one is the transform-based solution. Sometimes, these two methods are combined in literature.

3.3.1. Pixel Probability Modeling

According to Shannon's information theory, the optimal method for lossless coding can reach the minimal coding rate $-\log_2 p(x)$ where $p(x)$ is the probability of symbol x. A number of lossless coding methods were developed in literature and among them arithmetic coding is believed to be among the optimal ones. Given a probability distribution $p(x)$, arithmetic coding ensures that the coding rate to be as close as possible to its theoretical limit $-\log_2 p(x)$ without considering the rounding error. Therefore, the remaining problem is to how to determine the probability, which is however very challenging for natural image/video due to the curse of dimensionality.

Following the predictive coding strategy, one way to model $p(x)$ is to predict pixel probabilities one by one in a raster scan order based on previous observations, where x is an image.

$$p(x) = p(x_1)p(x_2 \mid x_1)...p(x_i \mid x_1,...,x_{i-1})...p(x_{m\times n} \mid x_1, ..., x_{m\times n-1}) \quad (1)$$

where m and n are the height and width of the image, respectively. The previous observation is also known as the context of the current pixel. When the image is large, it can be difficult to estimate the conditional probability, thereby a simplified method is to limit the range of its context.

$$p(x) = \quad (2)$$

$$p(x_1)p(x_2 \mid x_1) \ ... \ p(x_i \mid x_{i-k}, \ ... \ , x_{i-1}) \ ... \ p(x_{m\times n} \mid x_{m\times n-k}, \ ... \ , x_{m\times n-1})$$

where k is a pre-defined constant controlling the range of the context.

It should be noted that the condition may also take the sample values of other color components into consideration. For example, when coding the RGB color component, R sample is dependent on previously coded pixels (including R/G/B samples), the current G sample may be coded according to previously coded pixels and the current R sample, while for coding the current B sample, the previously coded pixels and the current R and G samples may also be taken into consideration. Neural networks were originally introduced for computer vision tasks and have been proven to be effective in regression and classification problems. Therefore, it has been proposed using neural networks to estimate the probability of $p(x_i)$ given its context $x_1, x_2, \ldots, x_{i-1}$. In a neural auto-regressive distribution estimator, the pixel probability is proposed for binary images, i.e., $x_i \in \{-1, +1\}$. The neural autoregressive distribution estimator (NADE) is designed for pixel probability modeling, where is a feedforward network with a single hidden layer. A similar work is proposed, where the feed-forward network also has connections skipping the hidden layer, and the parameters are also shared. Experiments are performed on the binarized MNIST dataset. NADE is extended to a real-valued model RNADE, where the probability $p(x_i|x_1, \ldots, x_{i-1})$ is derived with a mixture of Gaussians. Their feed-forward network also has a single hidden layer, but the hidden layer is with rescaling to avoid saturation and uses rectified linear unit (ReLU) instead of sigmoid. NADE and RNADE are improved by using reorganizing the order of the pixels and with deeper neural networks. Designing advanced neural networks plays an important role in improving pixel probability modeling. Multi-dimensional long short-term memory (LSTM) is proposed, which is working together with mixtures of conditional Gaussian scale mixtures for probability modeling. LSTM is a special kind of recurrent neural networks (RNNs) and is proven to be good at modeling sequential data. The spatial variant of LSTM is used for images later. Several different neural networks are studied, including RNNs and CNNs namely PixelRNN and PixelCNN, respectively. In PixelRNN, two variants of LSTM, called row LSTM and diagonal BILSTM are proposed, where the latter is specifically designed for images. PixelRNN incorporates residual connections to help train deep neural networks with up to 12 layers. In PixelCNN, masked convolutions are used to suit for the shape of the context. Comparing with previous works, PixelRNN and PixelCNN are more dedicated to natural images: they consider pixels as discrete values (e.g., 0, 1, . . . , 255) and predict a multinomial distribution over the discrete values; they deal with color images in RGB color space; they work well on large-scale image dataset ImageNet. Gated PixelCNN is proposed to improve the PixelCNN, and achieves comparable performance with PixelRNN but with much less complexity. PixelCNN++ is proposed with the following improvements upon PixelCNN: a discretized logistic mixture likelihood is used rather than a 256-way multinomial distribution; down-sampling is used to capture structures at multiple resolutions; additional short-cut connections are introduced to speed up training; dropout is adopted for regularization; RGB is combined for one pixel. PixelSNAIL is proposed, in which casual convolutions are combined with self-attention.

Most of the above methods directly model the probability distribution in the pixel domain. Some researchers also attempt to model the probability distribution as a conditional one upon explicit or latent representations. That being said, it may be estimated by:

$$p(x \mid h) = \prod_{i=1}^{m \times n} p(x_i \mid x_1, \ldots, x_{i-1}, h) \qquad (3)$$

where h is the additional condition and p(x)=p(h)p(x|h), meaning the modeling is split into an unconditional one and a conditional one. The additional condition can be image label information or high-level representations.

3.3.2. Auto-Encoder

Auto-encoder originates from the well-known work of reducing the dimensionality of data with neural networks. The method is trained for dimensionality reduction and consists of two parts: encoding and decoding. The encoding part converts the high-dimension input signal to low-dimension representations, typically with reduced spatial size but a greater number of channels. The decoding part attempts to recover the high-dimension input from the low-dimension representation. Auto-encoder enables automated learning of representations and eliminates the need of hand-crafted features, which is also believed to be one of the most important advantages of neural networks.

Figure 2:
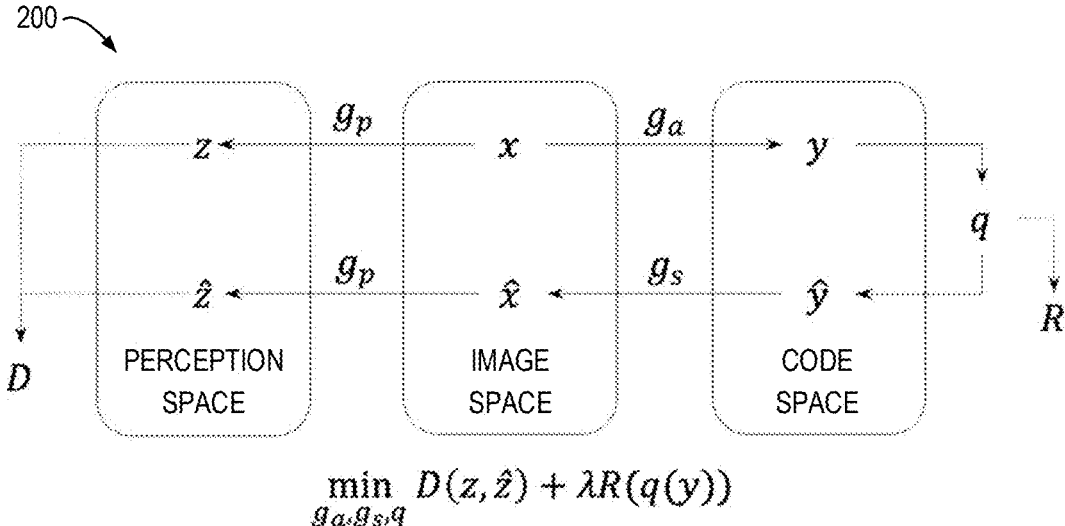
FIG. 2 illustrates a typical transform coding scheme.

FIG. 2 illustrates a typical transform coding scheme 200. The original image x is transformed by the analysis network $g_a$ to achieve the latent representation y. The latent representation y is quantized and compressed into bits. The number of bits R is used to measure the coding rate. The quantized latent representation $\hat{y}$ is then inversely transformed by a synthesis network $g_s$ to obtain the reconstructed image $\hat{x}$. The distortion is calculated in a perceptual space by transforming x and $\hat{x}$ with the function $g_p$.

It is intuitive to apply auto-encoder network to lossy image compression. It only needs to encode the learned latent representation from the well-trained neural networks. However, it is not trivial to adapt auto-encoder to image compression since the original auto-encoder is not optimized for compression thereby not efficient by directly using a trained auto-encoder. In addition, there exist other major challenges: First, the low-dimension representation should be quantized before being encoded, but the quantization is not differentiable, which is required in backpropagation while training the neural networks. Second, the objective under compression scenario is different since both the distortion and the rate need to be take into consideration. Estimating the rate is challenging. Third, a practical image coding scheme needs to support variable rate, scalability, encoding/decoding speed, interoperability. In response to these challenges, a number of researchers have been actively contributing to this area. The prototype auto-encoder for image compression is in FIG. 2, which can be regarded as a transform coding strategy. The original image x is transformed with the analysis network $y=g_a(x)$, where y is the latent representation which will be quantized and coded. The synthesis network will inversely transform the quantized latent representation $\hat{y}$ back to obtain the reconstructed image $\hat{x}=g_s(\hat{y})$. The framework is trained with the rate-distortion loss function, i.e., $\mathcal{L}=D+\lambda R$, where D is the distortion between x and $\hat{x}$, R is the rate calculated or estimated from the quantized representation $\hat{y}$, and $\lambda$ is the Lagrange multiplier. It should be noted that D can be calculated in either pixel domain or perceptual domain. All existing research works follow this prototype, and the difference might only be the network structure or loss function.

In terms of network structure, RNNs and CNNs are the most widely used architectures. In the RNNs relevant category, a general framework for variable rate image compression using RNN is proposed. Binary quantization is used to generate codes and do not consider rate during training. The framework indeed provides a scalable coding functionality, where RNN with convolutional and deconvolution layers is reported to perform decently. An improved version is proposed by upgrading the encoder with a neural network similar to PixelRNN to compress the binary codes. The performance is reportedly better than JPEG on Kodak image dataset using MS-SSIM evaluation metric. The RNN-based solution is further improved by introducing hidden-state priming. In addition, an SSIM-weighted loss function is also designed, and spatially adaptive bitrates mechanism is enabled. They achieve better results than BPG on Kodak image dataset using MS-SSIM as evaluation metric. Spatially adaptive bitrates is supported by training stop-code tolerant RNNs.

A general framework for rate-distortion optimized image compression is proposed. The use multiary quantization to generate integer codes and consider the rate during training, i.e. the loss is the joint rate-distortion cost, which can be MSE or others. They add random uniform noise to stimulate the quantization during training and use the differential entropy of the noisy codes as a proxy for the rate. They use generalized divisive normalization (GDN) as the network structure, which consists of a linear mapping followed by a nonlinear parametric normalization. The effectiveness of GDN on image coding is verified. It is proposed an improved version, where 3 convolutional layers each followed by a down-sampling layer and a GDN layer as the forward transform are used. Accordingly, 3 layers of inverse GDN each followed by an up-sampling layer and convolution layer to stimulate the inverse transform are used. In addition, an arithmetic coding method is devised to compress the integer codes. The performance is reportedly better than JPEG and JPEG 2000 on Kodak dataset in terms of MSE. Furthermore, the method is improved by devising a scale hyper-prior into the auto-encoder. The latent representation y is transformed with a subnet $h_a$ to $z=h_a(y)$ and z will be quantized and transmitted as side information. Accordingly, the inverse transform is implemented with a subnet $h_s$ attempting to decode from the quantized side information $\hat{z}$ to the standard deviation of the quantized $\hat{y}$, which will be further used during the arithmetic coding of $\hat{y}$. On the Kodak image set, their method is slightly worse than BPG in terms of PSNR. The structures in the residue space is further exploited by introducing an autoregressive model to estimate both the standard deviation and the mean. Gaussian mixture model is used to further remove redundancy in the residue. The reported performance is on par with the Kodak image set using PSNR as evaluation metric.

3.3.3. Hyper Prior Model

In the transform coding approach to image compression, the encoder subnetwork (section 3.3.2) transforms the image vector x using a parametric analysis transform $g_a(x, \varnothing_g)$ into a latent representation y, which is then quantized to form $\hat{y}$. Since $\hat{y}$ is discrete valued, it can be losslessly compressed using entropy coding techniques such as arithmetic coding and transmitted as a sequence of bits.

Figure 3:
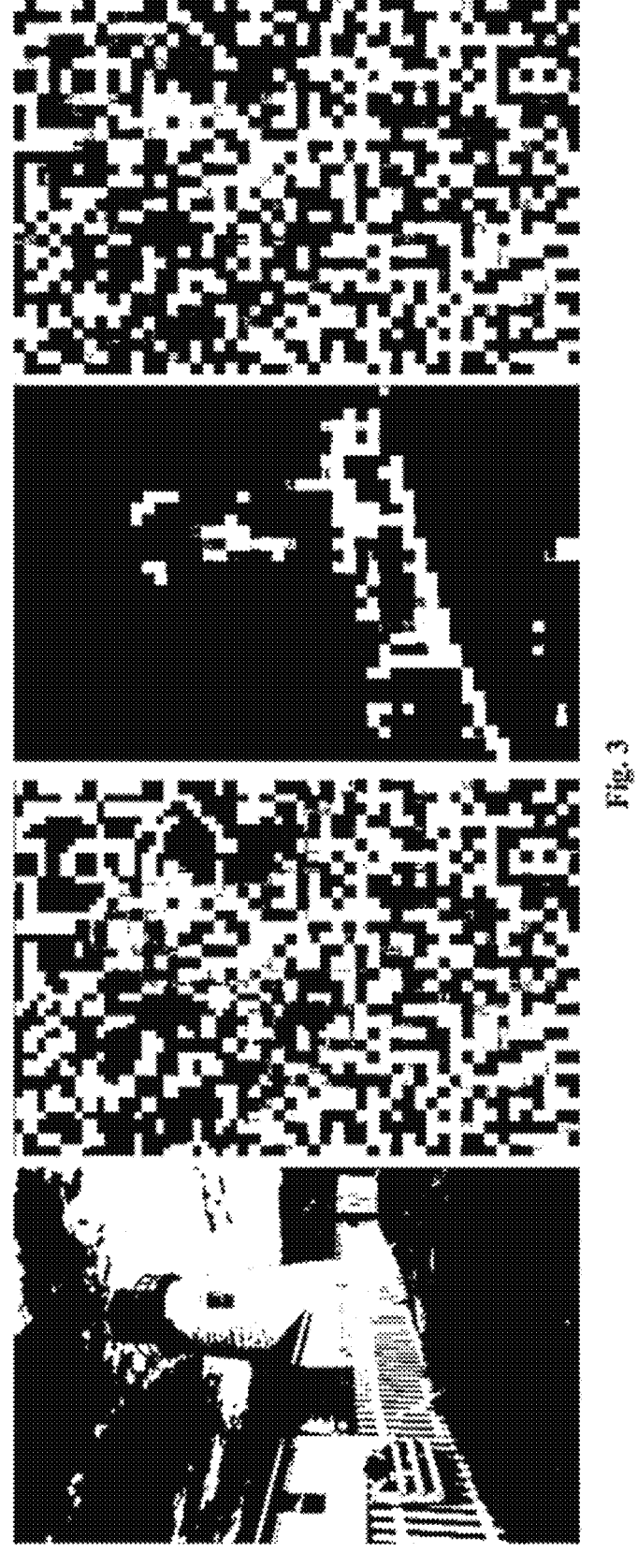
FIG. 3 illustrates an image from the Kodak dataset and different representations of the image.

FIG. 3 illustrates an example diagram 300 showing an image from the Kodak dataset and different representations of the image. Left: an image from the Kodak dataset. Middle left: visualization of the latent representation y of that image. Middle right: standard deviations σ of the latent. Right: latents y after the hyper prior (hyper encoder and decoder) network is introduced.

Figure 4:
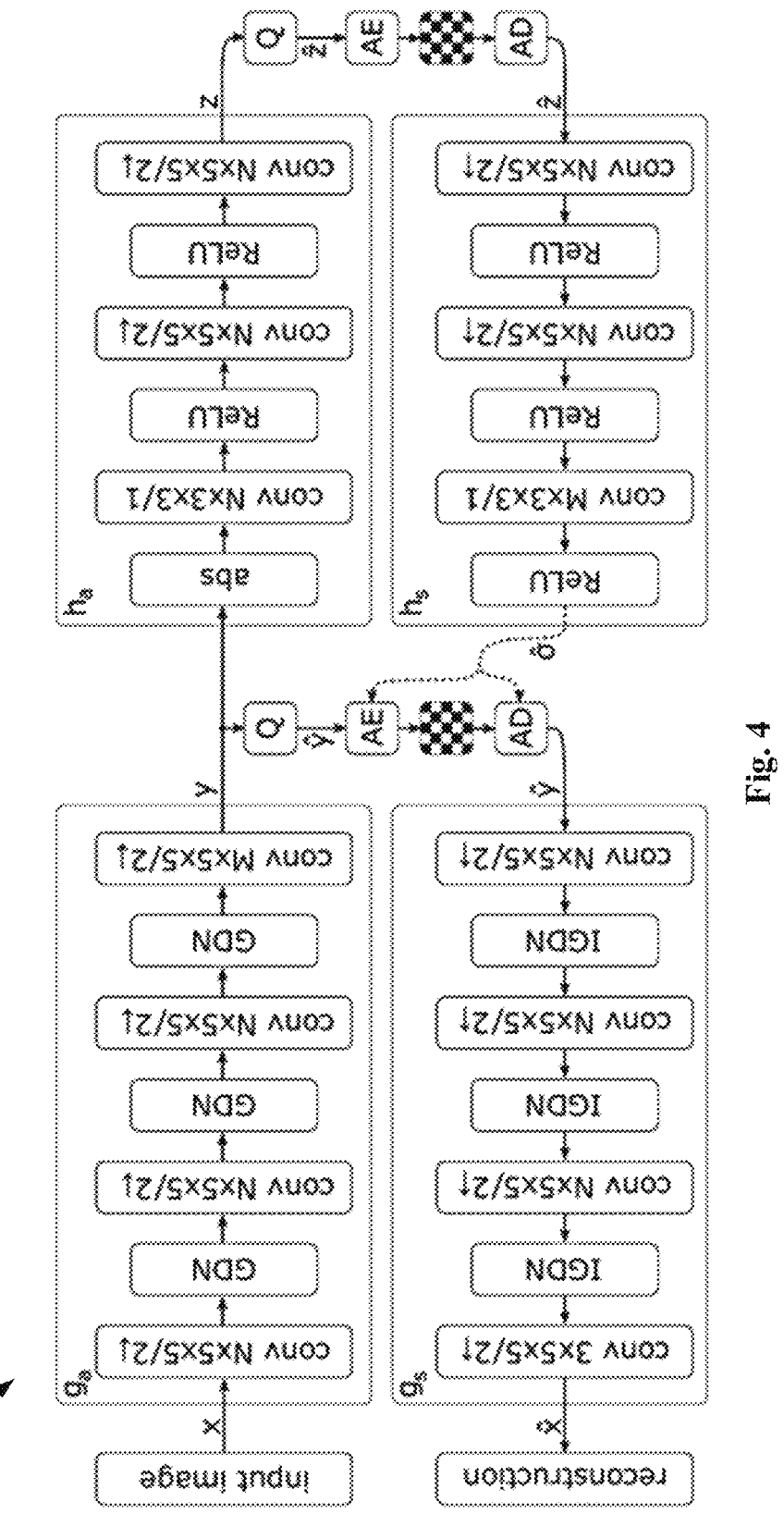
FIG. 4 illustrates a network architecture of an autoencoder implementing the hyperprior model.

As evident from the middle left and middle right image of FIG. 3, there are significant spatial dependencies among the elements of ŷ. Notably, their scales (middle right image) appear to be coupled spatially. An additional set of random variables ẑ are introduced to capture the spatial dependencies and to further reduce the redundancies. FIG. 4 illustrates a network architecture 400 of an autoencoder implementing the hyperprior model. In this case the image compression network is depicted in FIG. 4.

In FIG. 4, the left hand of the models is the encoder $g_a$ and decoder $g_s$ (explained in section 2.3.2). The right-hand side is the additional hyper encoder $h_a$ and hyper decoder $h_s$ networks that are used to obtain ẑ. In this architecture the encoder subjects the input image x to $g_a$, yielding the responses y with spatially varying standard deviations. The responses y are fed into $h_a$, summarizing the distribution of standard deviations in z. z is then quantized (ẑ), compressed, and transmitted as side information. The encoder then uses the quantized vector ẑ to estimate σ, the spatial distribution of standard deviations, and uses it to compress and transmit the quantized image representation ŷ. The decoder first recovers ẑ from the compressed signal. It then uses $h_s$ to obtain σ, which provides it with the correct probability estimates to successfully recover ŷ as well. It then feeds ŷ into $g_s$ to obtain the reconstructed image.

When the hyper encoder and hyper decoder are added to the image compression network, the spatial redundancies of the quantized latent ŷ are reduced. The rightmost image in FIG. 3 corresponds to the quantized latent when hyper encoder/decoder are used. Compared to middle right image, the spatial redundancies are significantly reduced, as the samples of the quantized latent are less correlated. FIG. 4 illustrates a network architecture 400 of an autoencoder implementing the hyperprior model. The left side shows an image autoencoder network, the right side corresponds to the hyperprior subnetwork. The analysis and synthesis transforms are denoted as $g_a$ and $g_a$. Q represents quantization, and AE, AD represent arithmetic encoder and arithmetic decoder, respectively. The hyperprior model consists of two subnetworks, hyper encoder (denoted with $h_a$) and hyper decoder (denoted with $h_s$). The hyper prior model generates a quantized hyper latent (ẑ) which comprises information about the probability distribution of the samples of the quantized latent ŷ. ẑ is included in the bitstream and transmitted to the receiver (decoder) along with ŷ.

3.3.4. Context Model

Although the hyper prior model improves the modelling of the probability distribution of the quantized latent ŷ, additional improvement can be obtained by utilizing an autoregressive model that predicts quantized latent from their causal context (Context Model).

Figure 5:
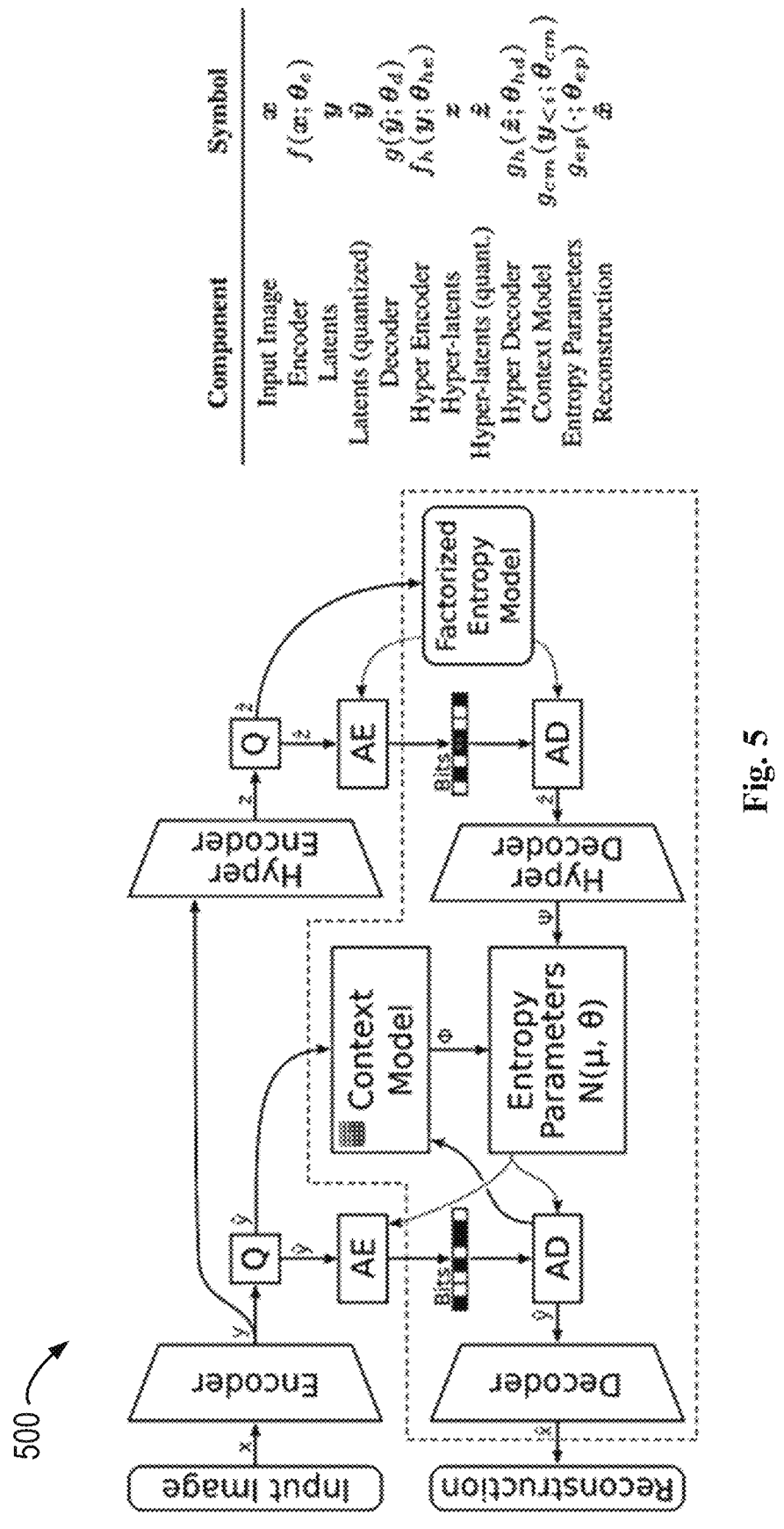
FIG. 5 illustrates a block diagram of a combined model.

FIG. 5 illustrates a block diagram 500 of a combined model. The combined model jointly optimizes an autoregressive component that estimates the probability distributions of latent from their causal context (Context Model) along with a hyperprior and the underlying autoencoder. Real-valued latent representations are quantized (Q) to create quantized latent (ŷ) and quantized hyper-latents (ẑ), which are compressed into a bitstream using an arithmetic encoder (AE) and decompressed by an arithmetic decoder (AD). The highlighted region corresponds to the components that are executed by the receiver (i.e. a decoder) to recover an image from a compressed bitstream.

The term auto-regressive means that the output of a process is later used as input to it. For example, the context model subnetwork generates one sample of a latent, which is later used as input to obtain the next sample.

A joint architecture where both hyper prior model subnetwork (hyper encoder and hyper decoder) and a context model subnetwork are utilized. The hyper prior and the context model are combined to learn a probabilistic model over quantized latent ŷ, which is then used for entropy coding. As depicted in FIG. 5, the outputs of context subnetwork and hyper decoder subnetwork are combined by the subnetwork called Entropy Parameters, which generates the mean μ and scale (or variance) σ parameters for a Gaussian probability model. The gaussian probability model is then used to encode the samples of the quantized latents into bitstream with the help of the arithmetic encoder (AE) module. In the decoder the gaussian probability model is utilized to obtain the quantized latent ŷ from the bitstream by arithmetic decoder (AD) module.

Typically, the latent samples are modeled as gaussian distribution or gaussian mixture models (not limited to). According to the FIG. 5, the context model and hyper prior are jointly used to estimate the probability distribution of the latent samples. Since a gaussian distribution can be defined by a mean and a variance (aka sigma or scale), the joint model is used to estimate the mean and variance (denoted as μ and σ).

3.3.5. The Encoding Process Using Joint Auto-Regressive Hyper Prior Model

The FIG. 5 corresponds to the state-of-the-art compression method of joint autoregressive and hierarchical priors for learned image compression. In this section and the next, the encoding and decoding processes will be described separately.

Figure 6:
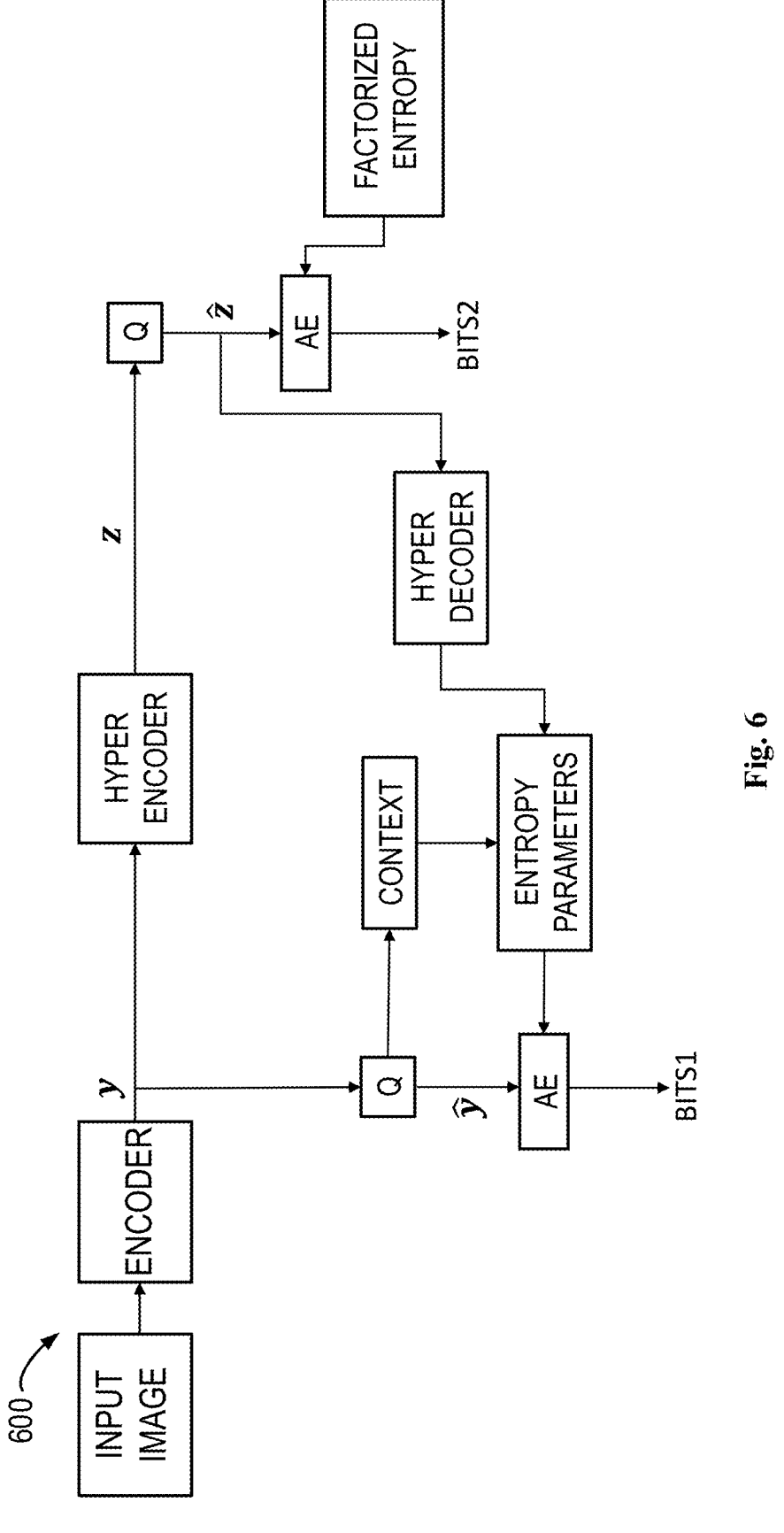
FIG. 6 illustrates an encoding process of the combined model.

FIG. 6 illustrates an encoding process 600 of the combined model. FIG. 6 depicts the encoding process. The input image is first processed with an encoder subnetwork. The encoder transforms the input image into a transformed representation called latent, denoted by y. y is then input to a quantizer block, denoted by Q, to obtain the quantized latent (ŷ). ŷ is then converted to a bitstream (bits1) using an arithmetic encoding module (denoted AE). The arithmetic encoding block converts each sample of the ŷ into a bitstream (bits1) one by one, in a sequential order.

The modules hyper encoder, context, hyper decoder, and entropy parameters subnetworks are used to estimate the probability distributions of the samples of the quantized latent ŷ. the latent y is input to hyper encoder, which outputs the hyper latent (denoted by z). The hyper latent is then quantized (ẑ) and a second bitstream (bits2) is generated using arithmetic encoding (AE) module. The factorized entropy module generates the probability distribution, that is used to encode the quantized hyper latent into bitstream. The quantized hyper latent includes information about the probability distribution of the quantized latent (ŷ).

The Entropy Parameters subnetwork generates the probability distribution estimations, that are used to encode the quantized latent ŷ. The information that is generated by the Entropy Parameters typically include a mean μ and scale (or variance) σ parameters, that are together used to obtain a gaussian probability distribution. A gaussian distribution of a random variable x is defined as $$f(x) = \frac{1}{\sigma\sqrt{2\pi}} e^{-\frac{1}{2}(\frac{x-\mu}{\sigma})^2}$$

wherein the parameter $\mu$ is the mean or expectation of the distribution (and also its median and mode), while the parameter $\sigma$ is its standard deviation (or variance, or scale). In order to define a gaussian distribution, the mean and the variance need to be determined. The entropy parameters module is used to estimate the mean and the variance values.

The subnetwork hyper decoder generates part of the information that is used by the entropy parameters subnetwork, the other part of the information is generated by the autoregressive module called context module. The context module generates information about the probability distribution of a sample of the quantized latent, using the samples that are already encoded by the arithmetic encoding (AE) module. The quantized latent $\hat{y}$ is typically a matrix composed of many samples. The samples can be indicated using indices, such as $\hat{y}[i, j, k]$ or $\hat{y}[i, j]$ depending on the dimensions of the matrix $\hat{y}$. The samples $\hat{y}[i, j]$ are encoded by AE one by one, typically using a raster scan order. In a raster scan order the rows of a matrix are processed from top to bottom, wherein the samples in a row are processed from left to right. In such a scenario (wherein the raster scan order is used by the AE to encode the samples into bitstream), the context module generates the information pertaining to a sample $\hat{y}[i, j]$, using the samples encoded before, in raster scan order. The information generated by the context module and the hyper decoder are combined by the entropy parameters module to generate the probability distributions that are used to encode the quantized latent $\hat{y}$ into bitstream (bits1).

Finally, the first and the second bitstream are transmitted to the decoder as result of the encoding process. It is noted that the other names can be used for the modules described above.

In the above description, all elements in FIG. 6 are collectively called encoder. The analysis transform that converts the input image into latent representation is also called an encoder (or auto-encoder).

3.3.6. The Decoding Process Using Joint Auto-Regressive Hyper Prior Model

FIG. 7 illustrates a decoding process 700 of the combined model. FIG. 7 depicts the decoding process separately corresponding to joint autoregressive and hierarchical priors for learned image compression. In the decoding process, the decoder first receives the first bitstream (bits1) and the second bitstream (bits2) that are generated by a corresponding encoder. The bits2 is first decoded by the arithmetic decoding (AD) module by utilizing the probability distributions generated by the factorized entropy subnetwork. The factorized entropy module typically generates the probability distributions using a predetermined template, for example using predetermined mean and variance values in the case of gaussian distribution. The output of the arithmetic decoding process of the bits2 is $\hat{z}$, which is the quantized hyper latent. The AD process reverts to AE process that was applied in the encoder. The processes of AE and AD are lossless, meaning that the quantized hyper latent $\hat{z}$ that was generated by the encoder can be reconstructed at the decoder without any change.

After obtaining of $\hat{z}$, it is processed by the hyper decoder, whose output is fed to entropy parameters module. The three subnetworks, context, hyper decoder and entropy parameters that are employed in the decoder are identical to the ones in the encoder. Therefore, the exact same probability distributions can be obtained in the decoder (as in encoder), which is essential for reconstructing the quantized latent $\hat{y}$ without any loss. As a result, the identical version of the quantized latent $\hat{y}$ that was obtained in the encoder can be obtained in the decoder. After the probability distributions (e.g. the mean and variance parameters) are obtained by the entropy parameters subnetwork, the arithmetic decoding module decodes the samples of the quantized latent one by one from the bitstream bits1. From a practical standpoint, autoregressive model (the context model) is inherently serial, and therefore cannot be sped up using techniques such as parallelization.

Finally, the fully reconstructed quantized latent $\hat{y}$ is input to the synthesis transform (denoted as decoder in FIG. 7) module to obtain the reconstructed image. In the above description, all of the elements in FIG. 7 are collectively called decoder. The synthesis transform that converts the quantized latent into reconstructed image is also called a decoder (or auto-decoder).

3.4. Neural Networks Based Video Compression

Similar to conventional video coding technologies, neural image compression serves as the foundation of intra compression in neural network-based video compression, thus development of neural network-based video compression technology comes later than neural network-based image compression but needs far more efforts to solve the challenges due to its complexity. Starting from 2017, a few researchers have been working on neural network-based video compression schemes. Compared with image compression, video compression needs efficient methods to remove inter-picture redundancy. Inter-picture prediction is then a crucial step in these works. Motion estimation and compensation is widely adopted but is not implemented by trained neural networks until recently.

Studies on neural network-based video compression can be divided into two categories according to the targeted scenarios: random access and the low-latency. In random access case, it requires the decoding can be started from any point of the sequence, typically divides the entire sequence into multiple individual segments and each segment can be decoded independently. In low-latency case, it aims at reducing decoding time thereby usually merely temporally previous frames can be used as reference frames to decode subsequent frames.

3.4.1. Low-Latency

A video compression scheme with trained neural networks is proposed. They first split the video sequence frames into blocks and each block will choose one from two available modes, either intra coding or inter coding. If intra coding is selected, there is an associated auto-encoder to compress the block. If inter coding is selected, motion estimation and compensation are performed with tradition methods and a trained neural network will be used for residue compression. The outputs of auto-encoders are directly quantized and coded by the Huffman method.

Another neural network-based video coding scheme with PixelMotionCNN is proposed. The frames are compressed in the temporal order, and each frame is split into blocks which are compressed in the raster scan order. Each frame will firstly be extrapolated with the preceding two reconstructed frames. When a block is to be compressed, the extrapolated frame along with the context of the current block are fed into the PixelMotionCNN to derive a latent representation. Then the residues are compressed by the variable rate image scheme. This scheme performs on par with H.264.

The real-sense end-to-end neural network-based video compression framework is proposed, in which all the modules are implemented with neural networks. The scheme accepts current frame and the prior reconstructed frame as inputs and optical flow will be derived with a pre-trained neural network as the motion information. The motion information will be warped with the reference frame followed by a neural network generating the motion compensated frame. The residues and the motion information are compressed with two separate neural auto-encoders. The whole framework is trained with a single rate-distortion loss function. It achieves better performance than H.264.

An advanced neural network-based video compression scheme is proposed. It inherits and extends traditional video coding schemes with neural networks with the following major features: 1) using only one auto-encoder to compress motion information and residues; 2) motion compensation with multiple frames and multiple optical flows; 3) an on-line state is learned and propagated through the following frames over time. This scheme achieves better performance in MS-SSIM than HEVC reference software.

An extended end-to-end neural network-based video compression framework based on the end-to-end deep video compression framework is proposed. In this solution, multiple frames are used as references. It is thereby able to provide a more accurate prediction of the current frame by using multiple reference frames and associated motion information. In addition, motion field prediction is deployed to remove motion redundancy along the temporal channel. Postprocessing networks are also introduced in this work to remove reconstruction artifacts from previous processes. The performance is better than the end-to-end deep video compression framework and H.265 by a noticeable margin in terms of both PSNR and MS-SSIM.

Scale-space flow is proposed to replace commonly used optical flow by adding a scale parameter based on the framework of the end-to-end deep video compression framework. It is reportedly achieving better performance than H.264.

A multi-resolution representation for optical flows based on the end-to-end deep video compression framework is proposed. Concretely, the motion estimation network produces multiple optical flows with different resolutions and lets the network learn which one to choose under the loss function. The performance is slightly improved compared with the end-to-end deep video compression framework and better than H.265.

3.4.2. Random Access

A neural network-based video compression scheme with frame interpolation is proposed. The keyframes are first compressed with a neural image compressor and the remaining frames are compressed in a hierarchical order. They perform motion compensation in the perceptual domain, i.e., deriving the feature maps at multiple spatial scales of the original frame and using motion to warp the feature maps, which will be used for the image compressor. The method is reportedly on par with H.264.

A method for interpolation-based video compression is proposed, wherein the interpolation model combines motion information compression and image synthesis, and the same auto-encoder is used for image and residual.

A neural network-based video compression method based on variational auto-encoders with a deterministic encoder is proposed. Concretely, the neural network model consists of an auto-encoder and an auto-regressive prior. Different from previous methods, this method accepts a group of pictures (GOP) as inputs and incorporates a 3D autoregressive prior by considering the temporal correlation while coding the latent representations. It provides comparative performance as H.265.

4. Problems

As illustrated in FIG. 6 and FIG. 7, all operations are combined with the neural network, and calculated with the floating-point system, which may lead to the following problems:

1. In the floating-point system, the precision of the calculation is dynamically changed according to the value range of variables. Although the same calculation is performed, its result on different devices will always be somewhat different, which is a disaster for entropy coding. Because even small changes will make the entropy coding undecodable. FIG. 8A and FIG. 8B show the example of this undecodable result.

FIG. 8A and FIG. 8B illustrate examples of the undecodable results on different devices. FIG. 8A shows the reconstructed image that is encoded and decoded by the same GPU device, while FIG. 8B is encoded by GPU and decoded by CPU.

From FIG. 8A and FIG. 8B, it can be seen that, due to the minor difference between GPU and CPU, the reconstruction from the entropy coding is increasingly different, making end-to-end image compression intractable in practical application.

2. The fix-point calculation can help to fix the precisions issue. However, the multiplication and accumulation operation inside the convolution layers makes it easy to obtain overflow errors during the calculation inside the neural network.

3. Moreover, the conversion between floating-point calculation and fix-point point calculation will introduce information loss both in the input and the neural network, leading to the compression performance drop.

4. The existing neural network structure of end-to-end image compression mainly focuses on compression performance without considering device interoperability. Therefore, interoperability-friendly neural network design is also needed.

5. Detail Solutions

To solve the above problems and some other problems not mentioned, methods, as summarized below, are disclosed. The embodiments should be considered as examples to explain the general concepts and should not be interpreted narrowly. Furthermore, these embodiments can be applied individually or combined in any manner.

The techniques described herein provide solutions to implement devices interoperability in end-to-end image compression. Quantization of the neural network is applied to convert the floating-point system to the fix-point. Meanwhile, scaling solutions may also be utilized to avoid the overflow issues that occur during the multiplication and accumulation of convolution and reduce the loss of the quantization. Moreover, interoperability-friendly neural network design is also provided, with the consideration of devices interoperability. In summary, let // denotes the integer division, the disclosure includes the following bullets.

1) To solve the first problem, quantization may be applied to realize a conversion between floating-point and fix-point.

a. In one example, the input data, and/or the convolution/transpose convolution layer, and/or the activation function are quantized to realize the conversion.

i. For example, both the input of the network and the convolution/transpose convolution layer are quantized to realize the conversion. And activation function can maintain in the floating-point.

b. In one example, when quantizing the convolution/transpose convolution layer, only the weight of the convolution/transpose convolution layer is quantized, while the bias of the convolution/transpose convolution layer is still in floating-point.

i. Alternatively, both the weight and bias of the convolution layer are quantized.

c. In one example, the recurrent neural network is quantized to realize the conversion.

2) To solve the second issue, the maximum value or absolute value of the input data V and/or the maximum value or absolute value of the network weights W may be limited. Let B denotes the maximum bits used in the fix-point calculation, one or more of the following approaches are disclosed:

a. In one example, the max value may be determined by the bits used for fix-point calculation and the shape of the convolution/transpose convolution layers. Let M, N, $K_H$, $K_W$ denote the number of the input channel, the number of the output channel, height of the kernel, and width of the kernel, respectively. One or more of the following methods may be used to determine V and W:

i. In one example, V and W are determined by:

$$V \times W = 2^{B-1} / (M \times N \times K_H \times K_W).$$

a) In one example, V and W are the same, which can be calculated as:

$$V = W = \sqrt{2^{B-1} / (M \times N \times K_H \times K_W)}.$$

b) Alternatively, the ratio between V and W is proportional to the statistic average values of different input data.

ii. Alternatively, V and W may be determined by:

$$\log_2 V + \log_2 W = B - \text{ceil}(\log_2(M \times N \times K_H \times K_W)) - 1.$$

a) In one example, V and W are the same, which can be calculated as:

$$V = W = 2^{(B-\text{ceil}(\log_2(M \times N \times K_H \times K_W))-1)//2}.$$

b) Alternatively, the ratio between V and W is proportional to the statistic average values of different input data.

iii. In one example, V and W are determined by the maximum absolute value $\text{Max}_c$ during the convolution calculation:

$$V \times W = 2^{B-1} / \text{Max}_c.$$

a) In one example, V and W are the same, which can be calculated as:

$$V = W = 2^{B-2} / \text{Max}_c.$$

b) Alternatively, the ratio between V and W is proportional to the statistic average values of different input data.

b. In one example, one or more of the following methods may be used:

i. In one example, V and W are determined by $$V \times W = 2^{B-1}.$$

a) In one example, V and W is the same, which can be calculated as $$V = W = 2^{(B-1)//2}.$$

b) Alternatively, the ratio between V and W is proportional to the statistic average values of different input data.

ii. Alternatively, V and W may be determined by:

$$\log_2 V + \log_2 W = B - 1.$$

a) In one example, V and W is the same, which can be calculated as $$V = W = 2^{(B-1)//2}.$$

b) Alternatively, the ratio between V and W is proportional to the statistic average values of different input data.

c. In one example, all layers inside the network use the same W. The minimum W of the network is used.

d. In one example, all layers utilize their own W, respectively.

e. In one example, the input data may be clipped to be within $\log_2 V$ bits.

i. For example, it may be clipped to be in [0, V−1].

ii. For example, it may be clipped to be in [−V/2, V/2−1].

f. In one example, the network weight may be clipped to be within $\log_2 W$ bits.

i. For example, it may be clipped to be in [0, W−1].

ii. For example, it may be clipped to be in [−W/2, W/2−1].

3) To solve the third problem, scaling may be utilized on input data and/or weighting values and/or mid-term data and/or output data of a network in E2E image/video coding.

a. Scaling may be utilized before or after the quantization.

b. In one example, the network weights must be scaled, input data may be scaled, and the output/mid-term results may be rescaled.

i. In one example, scaling and/or quantization are performed at each layer inside the network. And the rescaling is used at the output of each layer to recover the data.

ii. In one example, scaling and/or quantization are performed at the whole neural network, and only the input of the network is scaled. Rescaling is used at the output of the network.

iii. In one example, convolution/transpose convolution layers may be combined with the following activation layers to perform scaling and rescaling. In this case, the input of the convolution/transpose convolution may be scaled. And the output of the activation layers is recovered by rescaling.

c. In one example, maximum absolute values of the weights is utilized to obtain the scaling factors of the convolution/transpose convolution weights.

i. In one example, the maximum absolute value w of the convolution/transpose convolution layers is calculated, and the scaling factors can be obtained by:

$$s_w = 2^{W//w}.$$

ii. Alternatively, each output channel uses different scaling factors. So in the group of convolution/transpose convolution kernels $W_i$ for the same channel output, they may share the same scaling factor. And the maximum absolute values $w_i$ inside this group may be calculated. Then the scaling factor $s_{w_i}$ can be formulated by:

$$s_{w_i} = 2^{W_i//w_i}.$$

d. In one example, the bias of the convolution/transpose convolution layers may not be quantized, and the bias may be added at the output after the rescaling operation.

e. In one example, the bias is also quantized by the same scaling factors with the convolution/transpose convolution weights.

f. In one example, to obtain scaling factors of the input data, the small dataset may be used to observe the value change inside the network.

i. In one example, after the observing process, the maximum absolute value of the real data v can be obtained, and the scaling factors $s_d$ of the data can be formulated as:

$$s_d = V/v.$$

ii. Different datasets are used to obtain several different scaling factors in one example, which may be utilized for different images.

a) In one example, flags may need to be transmitted in the bitstream to clarify which set of the scaling factors is utilized.

b) In one example, the scaling factors can be selected by latent information or an additional network.

iii. In one example, the observing stage may be conducted in a large dataset to obtain accurate results.

g. In one example, during the encoding phase, the maximum value of the actual data v is directly used to calculate the scaling factors. In this case, the scaling factor is image independently.

i. In one example, this scaling factor information can be saved in the bitstream to obtain scaling factors in the decoding process.

ii. In one example, to obtain scaling factors in the decoding process, this scaling factor can be obtained with the aid of latent information.

h. Alternatively, the weight of the convolution/transpose convolution layer C can be scaled and quantized by scaling factors:

$$\hat{C}_i = \text{round}(C_i \times s_{w_i}),$$

where $C_i$ means a group of the convolution kernel weights that are utilized to obtain the results of the i-th channel, $\hat{C}_i$ means corresponding quantized weights.

i. In one example, the input data D can be scaled and quantized by scaling factors:

$$\hat{D} = \text{round}(D \times s_d),$$

where $\hat{D}$ denotes the quantized input data.

j. In one example, the scaled data may be processed by clipping operation:

$$\hat{D} = \text{clip}(\hat{D}, 0, V-1),$$

where clip (a,b,c) means clamps all elements in a into the range [b, c].

k. Alternatively, the scaled data may be processed by clipping operation:

$$\hat{D} = clip(\hat{D}, -V/2, V/2-1),$$

l. In one example, the output of the quantized layers may be rescaled to dequantize.

i. In one example, the rescaling operation of convolution/transpose convolution layers can be formulated as:

$$\hat{O} = O/(s_w \times s_d),$$

where O denotes the output of the layers, and $\hat{O}$ denotes the rescaled output.

ii. In one example, the rescaling of activation layers can be formulated as:

$$\hat{O} = O/s_d. \qquad 5$$

4) To solve the fourth problem, interoperability-friendly neural network design is also provided.
   a. In one example, group convolution/transpose convolution may be utilized to replace current convolution/transpose convolution.
   b. In one example, the number of layers is reduced to reduce the propagation of the quantization loss.
   c. In one example, the number of the kernel size is reduced.
   d. In one example, the channel number of the layer is reduced.
   e. In one example, ReLU may be used to replace LeakyReLU.
   f. In one example, the number of layers should be reduced.
   g. In one example, a larger kernel may be split into serval kernels to achieve a similar compression performance.
5) These device interoperability designs can be used in learned image and video compression.
   a. In one example, these device interoperability designs can be used in entropy coding to ensure the bitstream is decodable at any device.
   b. In one example, these device interoperability designs can be utilized in the analysis and synthesis part to ensure that the reconstruction is totally the same at different devices.
6) These device interoperability designs can be used in the work that is combined with traditional image and video compression and neural network technologies.
   a. In one example, these device interoperability designs can be used as the neural network-based transformation module used in traditional codec to make sure that the transformation results are the same on different devices and avoid error propagation.
   b. In one example, these device interoperability designs can be used as the neural network-based prediction module used in traditional codec to make sure that the prediction results are the same on different devices and avoid error propagation.
   c. In one example, this device interoperability design can be utilized in the in-loop filter to ensure that the result is the same on different devices and avoid error propagation.
7) Any information disclosed in this document such as information related to quantization or scaling in a learned based codec system, may be signaled from encoder to decoder.
   a. Alternatively, the information may be derived by the decoder adaptively.
   b. In one example, the information may be signaled/derived at sequence level/picture level/slice level/block level.
      i. In one example, the scaling factors may be signaled.
      ii. In one example, the maximum value of the weight may be signaled.
      iii. Alternatively, the maximum value of the input data may be signaled.

8) Any process disclosed in this document such as process related to quantization or scaling in a learned based codec system, may depend on coding information.
   a. Coding information may comprise color format or color component; dimensions of the picture/slice/block, or an indication signaled from an encoder to a decoder.

6. Embodiments

This embodiment describes an example of how designed scaling and quantization method solve the issue of device interoperability, and how the designed networks can help to preserve the performance after the device interoperability.

6.1. Realizing Fix Point Calculation in Entropy Coding

To realize fix point calculation in entropy coding, the maximum value of the input data and the weights should be determined, respectively. The algorithm description described herein is one possible solution to the proposed method. In this solution, the convolution structure may be first analyzed to obtain the maximum possible magnification of the intermediate result compared with the input value during the convolution calculation process. One potential calculation may be $M \times N \times K_H \times K_W$. After that, the relationship between the upper bound of the input data and the upper bound of convolution weights can be obtained by:

$$\log_2 V = \log_2 W = (B - \text{ceil}(\log_2(M \times N \times K_H \times K_W)) - 1)//2.$$

Then it needs to obtain the scaling factors used before quantization. In this embodiment, binary scaling is utilized to implement the scaling. The scaling of the convolution weights may perform channel by channel. Kernels that are utilized at the same output channel share the same scaling factor. The maximum absolute values w of these kernels may be applied as the reference, and the scaling factors of these kernels can thus be calculated as:

$$s_w = 2^{W//w} = 2^{((B-\text{ceil}(\log_2(M \times N \times K_H \times K_W))-1)//2)//w}.$$

Through the above calculation, the weight C of the convolution layers can be scaled and quantized by:

$$\hat{C}_i = \text{round}(C_i \times s_{w_i}),$$

where $C_i$ means a group of the convolution kernel weights that are utilized to obtain the results of the i-th channel, $\hat{C}_i$ means corresponding quantized weights.

To obtain the maximum absolute values of the input data, the observing stage is utilized. Different data is utilized as the input of the neural network. And the maximum absolute value of the input in each layer may be memorized respectively. And scaling factor of the data may be calculated by:

$$s_{d_t} = V/v_t,$$

where $s_{d_t}$ means the scaling factors of the input data at the t-th layer, $v_t$ means the maximum value of the input data at t-th layer. After obtaining the scaling factors of the input data, the scaling of the data can be calculated accordingly:

$$\hat{D}_t = \text{round}(D_t \times s_{d_t}),$$

where $D_t$ denotes the input data at t-th layer, and $\hat{D}_t$ denotes the quantized input data. To recover the output to the unquantized version, rescaling may be applied. Specifically, the rescaling operation can be formulated as:

$$\hat{O}_i = O_i / (s_{w_i} \times s_{d_t}),$$

where $O_i$ represents the output of the quantized i-th layers, and $\hat{O}_i$ denotes corresponding rescaling results.

For activation layers, only the input value needs to be scaled. The observing stage is also utilized in these layers, and the data may also be quantized like the operation in convolution layers. In this embodiment, the scaling and quantization are performed layer by layer, and the output of each quantized layer is rescaled to float tensor.

6.2. Neural Network Design for Friendly Device Interoperability

FIG. 9 illustrates an example of the device interoperability friendly design 900 in hyperprior network in accordance with embodiments of the present disclosure. FIG. 9 shows one possible structure of the hyperprior decoder to reduce the performance loss when realizing device interoperability.

In the example of FIG. 9, group convolution/transpose convolution is utilized to replace the original convolution. Meanwhile, only the ReLU activation function is selected to avoid the complexity of the quantization on the activation part. FIG. 10 shows another potential structure of the hyperprior decoder. FIG. 10 illustrates another example of the device interoperability friendly design 1000 in hyperprior network in accordance with embodiments of the present disclosure.

FIG. 10 illustrates another example of the device interoperability friendly design in hyperprior network. In FIG. 10, group convolution is also utilized. Meanwhile, the convolution layer containing a large kernel may be split into two convolution layers with a small kernel size.

More details of the embodiments of the present disclosure will be described below which are related to quantization process, a scaling process and a neural network model for visual data processing. As used herein, the term "data" or "visual data" may refer to an image, a frame in a video, a picture in a video, a video, or any other data suitable to be coded.

As discussed above, the precision of the calculation is dynamically changed according to the value range of variables. Although the same calculation is performed, its result on different devices will always be somewhat different, which is a disaster for entropy coding. The fix-point calculation can help to fix the precisions issue. However, the multiplication and accumulation operation inside the convolution layers makes it easy to obtain overflow errors during the calculation inside the neural network. Moreover, the conversion between floating-point calculation and fix-point point calculation will introduce information loss both in the input and the neural network, leading to the compression performance drop.

To solve the above problems and some other problems not mentioned, data processing solutions as described below are disclosed. The embodiments of the present disclosure should be considered as examples to explain the general concepts and should not be interpreted in a narrow way. Furthermore, these embodiments can be applied individually or combined in any manner.

FIG. 11 illustrates a flowchart of a method 1100 for visual data processing in accordance with embodiments of the present disclosure. The method 1100 is implemented for a conversion between visual data and a bitstream of the visual data.

At block 1110, a quantization process is performed on a dataset comprising at least one of: input visual data of a neural network model used for the conversion, or a parameter of the neural network model. In some embodiments, a fix-point representation of the dataset is obtained by performing the quantization process on a floating-point representation of the dataset. As used herein, the conversion between floating-point and fix-point may also be referred to as a "quantization conversion". For example, the input data, and/or the convolution or transpose convolution layer, and/or the activation function are quantized to realize the quantization conversion.

At block 1120, the conversion is performed based on the quantization process. In some embodiments, the conversion includes encoding the visual data into the bitstream. Alternatively, or in addition, in some embodiments, the conversion includes decoding the visual data from the bitstream.

With the method 1100, the quantization process may be applied to realize a conversion between floating-point and fix-point. By converting data in floating-point to data in fix-point, the neural network model can perform fix-point calculation, and thus can provide an unchanged precision on different devices. Thus, coding efficiency and coding effectiveness can be improved.

In some embodiments, the parameter of the neural network model comprises at least one of the following: a first parameter associated with a convolution layer or a transpose convolution layer of the neural network model, or a second parameter associated with an activation metric of the neural network model. That is, both the input of the network and the convolution layer or transpose convolution layer are quantized to realize the conversion. Activation function can maintain in the floating-point.

In some embodiments, the dataset comprises the input visual data and the first parameter, without the second parameter in floating-point. That is, both the input of the network and the convolution or transpose convolution layer are quantized to realize the quantization conversion, which the activation function maintains in floating-point.

In some embodiments, the first parameter comprises a weight of the convolution layer or the transpose convolution layer of the neural network model. In some embodiments, the first parameter does not comprise a bias of the convolution layer or the transpose convolution layer in floating-point. For example, the bias of the convolution layer or the transpose convolution layer may be in the floating-point. That is, when quantizing the convolution/transpose convolution layer, only the weight of the convolution/transpose convolution layer is quantized, while the bias of the convolution/transpose convolution layer is still in floating-point.

In some embodiments, the first data comprises a weight and a bias of the convolution layer or the transpose convolution layer of the neural network model. That is, both the weight and bias of the convolution layer are quantized.

In some embodiments, performing the quantization process comprises: applying the quantization process to the neural network model. In some embodiments, the neural network model comprises a recurrent neural network. For example, the recurrent neural network is quantized to realize the conversion.

In some embodiments, performing the quantization process comprises: determining at least one threshold for the dataset; and determining a fix-point representation of the dataset by performing the quantization process based on the at least one threshold.

In some embodiments, the at least one threshold comprises at least one of the following: a first threshold of a value or absolute value of the input visual data of the neural network model, or a second threshold of a value or absolute value of a weight of the neural network model.

In some embodiments, determining the at least one threshold comprises: determining the at least one threshold based on a maximum number of bits used in a fix-point operation and a shape of a convolution layer or a transpose convolution layer of the neural network model.

In some embodiments, the at least one threshold is determined based on a first metric as follows: $V \times W = 2^{B-1}/(M \times N \times K_H \times K_W)$, wherein V represents a first threshold of the at least one threshold for the input visual data of the neural network model, W represents a second threshold of the at least one threshold for a weight of the neural network model, B represents the maximum number of bits, M represents a number of input channels of the neural network model, N represents a number of output channels of the neural network model, $K_H$ represents a height of a kernel of the neural network model, and $K_W$ represents a width of the kernel.

In some embodiments, the first and second thresholds are further determined by: determining a ratio between the first threshold and the second threshold based on statistic average values of the input visual data; and determining the first and second thresholds based on the ratio and the first metric.

In some embodiments, the first and second thresholds are determined by $V = W = \sqrt{2^{B-1}/(M \times N \times K_H \times K_W)}$.

In some embodiments, the at least one threshold is determined based on a second metric as follows: $\log_2 V + \log_2 W = B - \text{ceil}(\log_2 (M \times N \times K_H \times K_W)) - 1$, wherein V represents a first threshold of the at least one threshold for the input visual data of the neural network model, W represents a second threshold of the at least one threshold for a weight of the neural network model, B represents the maximum number of bits, M represents a number of input channels of the neural network model, N represents a number of output channels of the neural network model, $K_H$ represents a height of a kernel of the neural network model, and $K_W$ represents a width of the kernel, and ceil( ) represents a ceiling metric.

In some embodiments, the first and second thresholds are further determined by: determining a ratio between the first threshold and the second threshold based on statistic average values of the input visual data; and determining the first and second thresholds based on the ratio and the second metric.

In some embodiments, the first and second thresholds are determined by using $V = W = 2^{(B-\text{ceil}(\log_2(M \times N \times K_H \times K_W))-1)//2}$.

In some embodiments, determining the at least one threshold comprises: determining a plurality of thresholds for weights of a plurality of layers of the neural network model.

In some embodiments, determining the at least one threshold comprises: determining a minimum threshold of the plurality of thresholds; and determining the minimum threshold as a threshold for weights of the plurality of layers of the neural network model.

In some embodiments, performing the quantization process comprises: determining a fix-point representation of the dataset by clipping the dataset based on the at least one threshold.

In some embodiments, determining the fix-point representation of the dataset comprises: determining the fix-point representation of the input visual data of the neural network model by clipping the input visual data based on a maximum number of bits.

In some embodiments, the maximum number of bits is $\log_2 V$ bits, V representing a first threshold of the at least one threshold for the input visual data, and wherein the input visual data is clipped to be in one of the following ranges: a first range of zero to $V-1$, or a second range of $-V/2$ to $V/2-1$.

In some embodiments, determining the fix-point representation of the dataset comprises: determining the fix-point representation of a weight of the neural network model by clipping the weight based on a maximum number of bits.

In some embodiments, the maximum number of bits is $\log_2 W$ bits, W representing a second threshold of the at least one threshold for the weight, and wherein the weight is clipped to be in one of the following ranges: a third range of zero to $W-1$, or a fourth range of $-W/2$ to $W/2-1$.

In some embodiments, determining the at least one threshold comprises: determining the at least one threshold based on a maximum absolute value of data during a convolution operation of the neural network model.

In some embodiments, wherein the at least one threshold is determined based on a third metric as follows: $V \times W = 2^{B-1}/\text{Max}_c$, wherein V represents a first threshold of the at least one threshold for the input visual data of the neural network model, W represents a second threshold of the at least one threshold for a weight of the neural network model, B represents a maximum number of bits used in a fix-point operation of the neural network model, and $\text{Max}_c$ represents the maximum absolute value during the convolution operation.

In some embodiments, the first and second thresholds are further determined by: determining a ratio between the first threshold and the second threshold based on statistic average values of the input visual data; and determining the first and second thresholds based on the ratio and the third metric.

In some embodiments, the first and second thresholds are determined by $V = W = 2^{B-2}/\text{Max}_c$.

In some embodiments, the at least one threshold is determined based on a fourth metric as follows: $V \times W = 2^{B-1}$, wherein V represents a first threshold of the at least one threshold for the input visual data of the neural network model, W represents a second threshold of the at least one threshold for a weight of the neural network model, B represents a maximum number of bits used in a fix-point operation of the neural network model.

In some embodiments, the first and second thresholds are further determined by: determining a ratio between the first threshold and the second threshold based on statistic average values of the input visual data; and determining the first and second thresholds based on the ratio and the fourth metric.

In some embodiments, the first and second thresholds are determined by $V = W = 2^{(B-1)//2}$.

In some embodiments, the at least one threshold is determined based on a fifth metric as follows: $\log_2 V + \log_2 W = B - 1$, wherein V represents a first threshold of the at least one threshold for the input visual data of the neural network model, W represents a second threshold of the at least one threshold for a weight of the neural network model, B represents a maximum number of bits used in a fix-point operation of the neural network model.

In some embodiments, the first and second thresholds are further determined by: determining a ratio between the first threshold and the second threshold based on statistic average values of the input visual data; and determining the first and second thresholds based on the ratio and the fifth metric.

In some embodiments, the first and second thresholds are determined by $V=W=2^{(B-1)//2}$.

According to further embodiments of the present disclosure, a non-transitory computer-readable recording medium is provided. The non-transitory computer-readable recording medium stores a bitstream of visual data which is generated by a method performed by an apparatus for visual data processing. According to the method, a quantization process is performed on a dataset comprising at least one of: input visual data of a neural network model used for generating the bitstream, or a parameter of the neural network model. The bitstream is generated based on the quantization process.

According to still further embodiments of the present disclosure, a method for storing bitstream of visual data is provided. In the method, a quantization process is performed on a dataset comprising at least one of: input visual data of a neural network model used for generating the bitstream, or a parameter of the neural network model. The bitstream is generated based on the quantization process. The bitstream is stored in a non-transitory computer-readable recording medium.

FIG. 12 illustrates a flowchart of a method 1200 for visual data processing in accordance with embodiments of the present disclosure. The method 1200 is implemented for a conversion between visual data and a bitstream of the visual data.

At block 1210, a scaling process is performed on a dataset comprising at least one of: input visual data of a neural network model used for the conversion, a parameter of the neural network model, intermediate visual data of the neural network model, or output visual data of the neural network model.

At block 1220, the conversion is performed based on the scaling process. In some embodiments, the conversion includes encoding the visual data into the bitstream. Alternatively, or in addition, in some embodiments, the conversion includes decoding the visual data from the bitstream.

The method 1200 enables the scaling process, and thus avoid the overflow issues occurring during the multiplication and accumulation of convolution. Thus, the quantization loss can be reduced, and coding efficiency and coding effectiveness can be improved.

In some embodiments, the conversion comprises an end-to-end image or video coding process.

In some embodiments, the parameter of the neural network model comprises a weight of the neural network model. That is, scaling may be utilized on input data and/or weighting values and/or mid-term data and/or output visual data of a network in E2E image/video coding.

In some embodiments, the scaling process is performed before or after a quantization process. That is, scaling may be utilized before or after the quantization.

In some embodiments, performing the scaling process on visual data comprises at least one of the following: performing the scaling process on the input visual data of the neural network model; or performing the scaling process on a weight of the neural network model. In some embodiments, the method 1200 further comprises: performing a rescaling process on the output visual data of the neural network model.

In some embodiments, at least one of the scaling process or a quantization process is applied to the neural network model.

In some embodiments, performing the scaling process on visual data comprises: performing the scaling process on the input visual data of the neural network model. In some example embodiments, the method 1200 further comprises: performing a rescaling process on the output visual data of the neural network model. That is, scaling and/or quantization are performed at the whole neural network, and only the input of the network is scaled. Rescaling is used at the output of the network.

In some embodiments, at least one of the scaling process or a quantization process is applied to each layer of the neural network model.

In some embodiments, the method 1200 further comprises: performing a rescaling process on output visual data of each layer of the neural network model.

In some embodiments, performing the scaling process on visual data comprises: performing the scaling process on input visual data of a convolution layer or a transpose convolution layer of the neural network model. In some embodiments, the method 1200 further comprises: performing a rescaling process on output visual data of an activation layer of the neural network model.

In some embodiments, the method 1200 further comprises: determining, based on a maximum absolute value of at least one weight of at least one convolution layer or transpose convolution layer of the neural network model, at least one scaling factor of the scaling process to be applied to the at least one weight.

In some embodiments, the at least one scaling factor is determined by using the following metric: $s_w=2^{W//w}$, wherein $s_w$ represents the scaling factor, W represents a threshold for the at least one weight, and w represents the maximum absolute value of the at least one weight.

In some embodiments, the at least one scaling factor comprises a plurality of scaling factors for a plurality of channels of the neural network model, a convolutional kernel or transpose convolution kernel of one of the plurality channels being associated with a respective scaling factor of the plurality of scaling factors.

In some embodiments, the at least one scaling factor is determined based on the following metric: $s_{w_i}=2^{W_i//w_i}$, wherein $s_{w_i}$ represents a scaling factor for the at least one convolutional kernel or transpose convolution kernel associated with an i-th channel of the neural network model, i being an integer, $W_i$ represents a threshold for the at least one weight of the at least one convolutional kernel or transpose convolution kernel associated with the i-th channel, and $w_i$ represents the maximum absolute value of the at least one weight.

In some embodiments, the method 1200 further comprises: performing a rescaling process to the output visual data of the neural network model; and adding a bias of a convolution layer or a transpose convolution layer of the neural network model to the rescaled output visual data without quantizing the bias.

In some embodiments, the method 1200 further comprises: performing a quantization process to a bias of a convolution layer or a transpose convolution layer of the neural network model based on a scaling factor, the scaling factor being applied to a weight of the convolution layer or the transpose convolution layer.

In some embodiments, the method 1200 further comprises: determining value change information of a reference dataset, the value change information indicating a change of the reference dataset inside the neural network model; and determining, based on the value change information, a scaling factor of the scaling process to be applied to input visual data of the neural network model. The reference dataset may be any suitable training dataset or reference dataset for training the neural network model. The reference dataset may comprise visual data such as images, pictures, frames, videos, or the like.

In some embodiments, a number of samples in the reference dataset is smaller than a threshold number. That is, to obtain scaling factors of the input visual data, a small reference dataset may be used to observe the value change inside the network.

In some embodiments, the value change information comprises a maximum absolute value of the input visual data, and the scaling factor is determined by using the following: $s_d=V/v$, wherein $s_d$ represents the scaling factor, V represents a threshold for the input visual data, and v represents the maximum absolute value of the input visual data.

In some embodiments, a number of samples in the reference dataset is larger than or equal to a threshold number. That is, the observing stage of the value change information may be conducted in a large reference dataset to obtain accurate results.

In some embodiments, the method 1200 further comprises: obtaining a plurality of reference datasets; determining a plurality of value change information of the plurality of reference datasets inside the neural network model; and determining, based on the plurality of value change information, a plurality of scaling factors of the scaling process for a plurality of sets of visual data. For example, the plurality of scaling factors may be used for a plurality of images or a plurality of frames of a video.

In some embodiments, the method 1200 further comprises: including a scaling factor flag in the bitstream, the scaling factor flag indicating one of the plurality of scaling factors to be applied in the scaling process.

In some embodiments, the method 1200 further comprises: selecting, based on an additional model or latent information of the neural network model, a scaling factor from the plurality of scaling factors to be applied in the scaling process.

In some embodiments, at least one weight of a convolution layer or a transpose convolution layer C of the neural network model is scaled and quantized based on the following: $\hat{C}_i=\text{round}(C_i \times s_{w_i})$, wherein $C_i$ represents a group of convolution kernel weights associated with an i-th channel of the neural network model, i being an integer, $s_{w_i}$ represents a scaling factor for the group of convolution kernel weights associated with the i-th channel, $\hat{C}_i$ represents a group of quantized weights, and round( ) represents a rounding operation.

In some embodiments, the input visual data of the neural network model is scaled and quantized based on the following: $\hat{D}=\text{round}(D \times s_d)$, wherein D represents the input visual data, $s_d$ represent the scaling factor, $\hat{D}$ represents the quantized input visual data, and round( ) represents a rounding operation.

In some embodiments, the method 1200 further comprises: performing a clipping operation on scaled input visual data.

In some embodiments, the clipping operation is one of the following: $\tilde{D}=\text{clip}(\hat{D}, 0, V-1)$, or $\tilde{D}=\text{clip}(\hat{D}, -V/2, V/2-1)$, wherein $\hat{D}$ represents the scaled input visual data, V represents a threshold for the input visual data, $\tilde{D}$ represents the clipped scaled input visual data, and clip (A, B, C) represents a clipping operation for clamping elements in A into a range from B to C.

In some embodiments, the method 1200 further comprises: performing a dequantization process by rescaling output visual data of a quantized layer of the neural network model.

In some embodiments, the output visual data is rescaled by using the following: $\hat{O}=O/(s_w \times s_d)$, wherein O represents output visual data of a convolution layer or a transpose convolution layer of the neural network model, $s_w$ represents a scaling factor for a weight of the convolution layer or transpose convolution layer, $s_d$ represents a scaling factor for input visual data of the neural network model, and $\hat{O}$ represents the rescaled output visual data.

In some embodiments, the output visual data is rescaled by using the following: $\hat{O}=O/s_d$, wherein O represents output visual data of an activation layer of the neural network model, $s_d$ represents a scaling factor for the input visual data of the neural network model, and $\hat{O}$ represents the rescaled output visual data.

In some embodiments, the method 1200 further comprises: determining a scaling factor of the scaling process based on a maximum value of visual data during an encoding process.

In some embodiments, the scaling factor is independent of the visual data. For example, the scaling factor may be image independently, picture independently, frame independently or video independently.

In some embodiments, the method 1200 further comprises: including scaling factor information of the determined scaling factor in the bitstream; and determining a further scaling factor used in a decoding process based on the scaling factor information.

In some embodiments, determining the further scaling factor comprises: determining a further scaling factor used in a decoding process based on latent information of the neural network model.

In some embodiments, the neural network model comprises a recurrent neural network.

According to further embodiments of the present disclosure, a non-transitory computer-readable recording medium is provided. The non-transitory computer-readable recording medium stores a bitstream of visual data which is generated by a method performed by an apparatus for visual data processing. In the method, a scaling process is performed on a dataset comprising at least one of: input visual data of a neural network model used for generating the bitstream, a parameter of the neural network model, intermediate visual data of the neural network model, or output visual data of the neural network model. The bitstream is generated based on the scaling process.

According to still further embodiments of the present disclosure, a method for storing data bitstream of visual data is provided. In the method, a scaling process is performed on a dataset comprising at least one of: input visual data of a neural network model used for generating the bitstream, a parameter of the neural network model, intermediate visual data of the neural network model, or output visual data of the neural network model. The bitstream is generated based on the scaling process. The bitstream is stored in a non-transitory computer-readable recording medium.

FIG. 13 illustrates a flowchart of a method 1300 for visual data processing in accordance with embodiments of the present disclosure. The method 1300 is implemented for a conversion between visual data and a bitstream of the visual data.

At block 1310, a conversion between visual data and a bitstream of the visual data is performed by using a neural network model. The neural network model is interoperability-friendly. In some embodiments, the conversion includes encoding the visual data into the bitstream. Alternatively, or in addition, in some embodiments, the conversion includes decoding the visual data from the bitstream.

The neural network model is characterized in that a number of channels of a layer of the neural network model being less than a threshold channel number. That is, the channel number of the layer is reduced.

Alternatively, or in addition, the neural network model is characterized in that the neural network model using a rectified linear unit (ReLU). For example, the neural network model may use a ReLU instead of a leaky ReLU. In other words, ReLU may be used to replace LeakyReLU.

Alternatively, or in addition, the neural network model is characterized in that a number of layers of the neural network model being less than a threshold layer number. For example, the number of layers should be reduced.

Alternatively, or in addition, the neural network model is characterized in that the neural network model using a group convolution or a group transpose convolution. For example, group convolution/transpose convolution may be utilized to replace current convolution/transpose convolution.

Alternatively, or in addition, the neural network model is characterized in that a kernel size of the neural network model being less than a threshold kernel size. For example, the number of the kernel size is reduced.

As used herein, the neural network model characterized in at least one of the above features may be referred to as an "interoperability-friendly" model or "interoperability-friendly" neural network model. A device using such neural network model may be referred to as a device with interoperability design.

By utilizing the interoperability-friendly neural network model or interoperability-friendly neural network design in visual data processing, devices interoperability can be improved, and thus coding efficiency and coding effectiveness can be improved.

In some embodiments, a propagation of a quantization loss associated with the neural network model is less than a further loss associated with a further model with a further number of layers, the further number exceeding the threshold layer number. In other words, the number of layers is reduced to reduce the propagation of the quantization loss.

In some embodiments, a kernel of the neural network model is divided into a plurality of kernels with a kernel size less than the threshold kernel size. For example, a larger kernel may be split into serval kernels to achieve a similar compression performance.

In some embodiments, the neural network model is used in learned image and video compression. That is, these device interoperability designs can be used in learned image and video compression.

In some embodiments, the neural network model is used in entropy coding during the conversion. For example, these device interoperability designs can be used in entropy coding to ensure the bitstream is decodable at any device.

In some embodiments, the neural network model is used in an analysis and synthesis part for the conversion. By way of example, these device interoperability designs can be utilized in the analysis and synthesis part to ensure that the reconstruction is totally the same at different devices.

In some embodiments, the neural network model is used in combination with a further coding tool. By way of example, the further coding tool comprises at least one of the following: an image compression tool, a video compression tool, or a neural network technology. In other words, these device interoperability designs can be used in the work that is combined with traditional image and video compression and neural network technologies.

In some embodiments, the neural network model is used as a neural network-based transformation module during the conversion. For example, these device interoperability designs can be used as the neural network-based transformation module used in traditional codec to make sure that the transformation results are the same on different devices and avoid error propagation.

In some embodiments, the neural network model is used as a neural network-based prediction module during the conversion. That is, these device interoperability designs can be used as the neural network-based prediction module used in traditional codec to make sure that the prediction results are the same on different devices and avoid error propagation.

In some embodiments, the neural network model is used in an in-loop filter during the conversion. For example, this device interoperability design can be utilized in the in-loop filter to ensure that the result is the same on different devices and avoid error propagation.

According to further embodiments of the present disclosure, a non-transitory computer-readable recording medium is provided. The non-transitory computer-readable recording medium stores a bitstream of visual data which is generated by a method performed by an apparatus for visual data processing. In the method, the bitstream is generated by using a neural network model. The neural network model is characterized in at least one of the following: a number of channels of a layer of the neural network model being less than a threshold channel number, the neural network model using a rectified linear unit (ReLU), a number of layers of the neural network model being less than a threshold layer number, the neural network model using a group convolution or a group transpose convolution, or a kernel size of the neural network model being less than a threshold kernel size.

According to still further embodiments of the present disclosure, a method for storing bitstream of visual data is provided. In the method, the bitstream is generated by using a neural network model. The bitstream is stored in a non-transitory computer-readable recording medium. The neural network model is characterized in at least one of the following: a number of channels of a layer of the neural network model being less than a threshold channel number, the neural network model using a rectified linear unit (ReLU), a number of layers of the neural network model being less than a threshold layer number, the neural network model using a group convolution or a group transpose convolution, or a kernel size of the neural network model being less than a threshold kernel size.

In some embodiments, the method 1100, method 1200, and/or method 1300 further comprise: including information regarding learned-based coding during the conversion in the bitstream.

Alternatively, or in addition, in some embodiments, the method 1100, method 1200, and/or method 1300 may further comprise: determining information regarding learned-based coding by a decoder associated with the conversion.

In some embodiments, the information is associated with a quantization process or a scaling process for the conversion.

In some embodiments, the information is included at one of the following: a sequence level, a picture level, a slice level, or a block level.

In some embodiments, the information comprises at least one of the following: a scaling factor of a scaling process for the conversion, a first threshold of input visual data of the neural network model, or a second threshold of a weight of the neural network model.

In some embodiments, a process using a learned-based coding for the conversion depends on coding information.

In some embodiments, the process comprises at least one of the following: a quantization process, or a scaling process.

In some embodiments, the coding information comprises at least one of the following: a color format, a color component, a dimension of a picture, a dimension of a slice, a dimension of a block, or an indication in the bitstream.

Implementations of the present disclosure can be described in view of the following clauses, the features of which can be combined in any reasonable manner.

Clause 1. A method for visual data processing, comprising: performing, for a conversion between visual data and a bitstream of the visual data, a quantization process on a dataset comprising at least one of: input visual data of a neural network model used for the conversion, or a parameter of the neural network model; and performing the conversion based on the quantization process.

Clause 2. The method of clause 1, wherein performing the quantization process comprises: obtaining a fix-point representation of the dataset by performing the quantization process on a floating-point representation of the dataset.

Clause 3. The method of clause 1 or clause 2, wherein the parameter of the neural network model comprises at least one of the following: a first parameter associated with a convolution layer or a transpose convolution layer of the neural network model, or a second parameter associated with an activation metric of the neural network model.

Clause 4. The method of clause 3, wherein the dataset comprises the input visual data and the first parameter, without the second parameter in floating-point.

Clause 5. The method of clause 3 or clause 4, wherein first parameter comprises a weight of the convolution layer or the transpose convolution layer of the neural network model.

Clause 6. The method of clause 5, wherein the first parameter does not comprise a bias of the convolution layer or the transpose convolution layer in floating-point.

Clause 7. The method of clause 3, wherein the first parameter comprises a weight and a bias of the convolution layer or the transpose convolution layer of the neural network model.

Clause 8. The method of clause 1-7, wherein the neural network model comprises a recurrent neural network.

Clause 9. The method of any of clauses 1-8, wherein performing the quantization process comprises: determining at least one threshold for the dataset; and determining a fix-point representation of the dataset by performing the quantization process based on the at least one threshold.

Clause 10. The method of clause 9, wherein the at least one threshold comprises at least one of the following: a first threshold of a value or absolute value of the input visual data of the neural network model, or a second threshold of a value or absolute value of a weight of the neural network model.

Clause 11. The method of clause 9 or clause 10, wherein determining the at least one threshold comprises: determining the at least one threshold based on a maximum number of bits used in a fix-point operation and a shape of a convolution layer or a transpose convolution layer of the neural network model.

Clause 12. The method of clause 11, wherein the at least one threshold is determined based on a first metric as follows: $V \times W = 2^{B-1}/(M \times N \times K_H \times K_W)$, wherein V represents a first threshold of the at least one threshold for the input visual data of the neural network model, W represents a second threshold of the at least one threshold for a weight of the neural network model, B represents the maximum number of bits, M represents a number of input channels of the neural network model, N represents a number of output channels of the neural network model, $K_H$ represents a height of a kernel of the neural network model, and $K_W$ represents a width of the kernel.

Clause 13. The method of clause 12, wherein the first and second thresholds are further determined by: determining a ratio between the first threshold and the second threshold based on statistic average values of the input visual data; and determining the first and second thresholds based on the ratio and the first metric.

Clause 14. The method of clause 12, wherein the first and second thresholds are determined by $V = W = \sqrt{2^{B-1}/(M \times N \times K_H \times K_W)}$.

Clause 15. The method of clause 11, wherein the at least one threshold is determined based on a second metric as follows: $\log_2 V + \log_2 W = B - \text{ceil}(\log_2 (M \times N \times K_H \times K_W)) - 1$, wherein V represents a first threshold of the at least one threshold for the input visual data of the neural network model, W represents a second threshold of the at least one threshold for a weight of the neural network model, B represents the maximum number of bits, M represents a number of input channels of the neural network model, N represents a number of output channels of the neural network model, $K_H$ represents a height of a kernel of the neural network model, and $K_W$ represents a width of the kernel, and ceil( ) represents a ceiling metric.

Clause 16. The method of clause 15, wherein the first and second thresholds are further determined by: determining a ratio between the first threshold and the second threshold based on statistic average values of the input visual data; and determining the first and second thresholds based on the ratio and the second metric.

Clause 17. The method of clause 15, wherein the first and second thresholds are determined by using $V = W = 2^{(B-\text{ceil}(\log_2 (M \times N \times K_H \times K_W))-1)//2}$, // representing an integer division operation.

Clause 18. The method of any of clauses 9-17, wherein determining the at least one threshold comprises: determining a plurality of thresholds for weights of a plurality of layers of the neural network model.

Clause 19. The method of clause 18, wherein determining the at least one threshold comprises: determining a minimum threshold of the plurality of thresholds; and determining the minimum threshold as a threshold for weights of the plurality of layers of the neural network model.

Clause 20. The method of any of clauses 9-19, wherein performing the quantization process comprises: determining a fix-point representation of the dataset by clipping the dataset based on the at least one threshold.

Clause 21. The method of clause 20, wherein determining the fix-point representation of the dataset comprises: determining the fix-point representation of the input visual data of the neural network model by clipping the input visual data based on a maximum number of bits.

Clause 22. The method of clause 21, wherein the maximum number of bits is $\log_2 V$ bits, V representing a first threshold of the at least one threshold for the input visual data, and wherein the input visual data is clipped to be in one of the following ranges: a first range of zero to V−1, or a second range of −V/2 to V/2−1.

Clause 23. The method of clause 20, wherein determining the fix-point representation of the dataset comprises: determining the fix-point representation of a weight of the neural network model by clipping the weight based on a maximum number of bits.

Clause 24. The method of clause 23, wherein the maximum number of bits is $\log_2 W$ bits, W representing a second threshold of the at least one threshold for the weight, and wherein the weight is clipped to be in one of the following ranges: a third range of zero to W−1, or a fourth range of −W/2 to W/2−1.

Clause 25. The method of clause 9 or clause 10, wherein determining the at least one threshold comprises: determining the at least one threshold based on a maximum absolute value of data during a convolution operation of the neural network model.

Clause 26. The method of clause 25, wherein the at least one threshold is determined based on a third metric as follows: $V \times W = 2^{B-1}/Max_c$, wherein V represents a first threshold of the at least one threshold for the input visual data of the neural network model, W represents a second threshold of the at least one threshold for a weight of the neural network model, B represents a maximum number of bits used in a fix-point operation of the neural network model, and $Max_c$ represents the maximum absolute value during the convolution operation.

Clause 27. The method of clause 26, wherein the first and second thresholds are further determined by: determining a ratio between the first threshold and the second threshold based on statistic average values of the input visual data; and determining the first and second thresholds based on the ratio and the third metric.

Clause 28. The method of clause 27, wherein the first and second thresholds are determined by $V=W=2^{B-2}/Max_c$.

Clause 29. The method of clause 9 or clause 10, wherein the at least one threshold is determined based on a fourth metric as follows: $V \times W = 2^{B-1}$, wherein V represents a first threshold of the at least one threshold for the input visual data of the neural network model, W represents a second threshold of the at least one threshold for a weight of the neural network model, B represents a maximum number of bits used in a fix-point operation of the neural network model.

Clause 30. The method of clause 29, wherein the first and second thresholds are further determined by: determining a ratio between the first threshold and the second threshold based on statistic average values of the input visual data; and determining the first and second thresholds based on the ratio and the fourth metric.

Clause 31. The method of clause 9 or clause 10, wherein the at least one threshold is determined based on a fifth metric as follows: $\log_2 V + \log_2 W = B-1$, wherein V represents a first threshold of the at least one threshold for the input visual data of the neural network model, W represents a second threshold of the at least one threshold for a weight of the neural network model, B represents a maximum number of bits used in a fix-point operation of the neural network model.

Clause 32. The method of clause 31, wherein the first and second thresholds are further determined by: determining a ratio between the first threshold and the second threshold based on statistic average values of the input visual data; and determining the first and second thresholds based on the ratio and the fifth metric.

Clause 33. The method of clause 29 or clause 31, wherein the first and second thresholds are determined by $V=W=2^{(B-1)//2}$, // representing an integer division operation.

Clause 34. A method for visual data processing, comprising: performing, for a conversion between visual data and a bitstream of the visual data, a scaling process on a dataset comprising at least one of: input visual data of a neural network model used for the conversion, a parameter of the neural network model, intermediate visual data of the neural network model, or output visual data of the neural network model; and performing the conversion based on the scaling process.

Clause 35. The method of clause 34, wherein the parameter of the neural network model comprises a weight of the neural network model.

Clause 36. The method of clause 34 or clause 35, wherein the conversion comprises an end-to-end image or video coding process.

Clause 37. The method of any of clauses 34-36, wherein the scaling process is performed before or after a quantization process.

Clause 38. The method of any of clauses 34-37, wherein performing the scaling process comprises: performing the scaling process on the input visual data of the neural network model; and performing the scaling process on a weight of the neural network model, wherein the method further comprises: performing a rescaling process on the output visual data of the neural network model.

Clause 39. The method of any of clauses 34-38, wherein at least one of the scaling process or a quantization process is applied to the neural network model.

Clause 40. The method of clause 39, wherein performing the scaling process comprises: performing the scaling process on the input visual data of the neural network model, wherein the method further comprises: performing a rescaling process on the output visual data of the neural network model.

Clause 41. The method of any of clauses 34-38, wherein at least one of the scaling process or a quantization process is applied to each layer of the neural network model.

Clause 42. The method of clause 41, further comprising: performing a rescaling process on output visual data of each layer of the neural network model.

Clause 43. The method of any of clauses 34-38, wherein performing the scaling process comprises: performing the scaling process on input visual data of a convolution layer or a transpose convolution layer of the neural network model, wherein the method further comprises: performing a rescaling process on output visual data of an activation layer of the neural network model.

Clause 44. The method of any of clauses 34-43, further comprising: determining, based on a maximum absolute value of at least one weight of at least one convolution layer or transpose convolution layer of the neural network model, at least one scaling factor of the scaling process to be applied to the at least one weight.

Clause 45. The method of clause 44, wherein the at least one scaling factor is determined based on the following metric: $s_w=2^{W/w}$, wherein $s_w$ represents the scaling factor, W represents a threshold for the at least one weight, w represents the maximum absolute value of the at least one weight, and // represents an integer division operation.

Clause 46. The method of clause 44, wherein the at least one scaling factor comprises a plurality of scaling factors for a plurality of channels of the neural network model, a convolutional kernel or transpose convolution kernel of one of the plurality channels being associated with a respective scaling factor of the plurality of scaling factors.

Clause 47. The method of clause 46, wherein the at least one scaling factor is determined based on the following metric: $s_{w_i}=2^{W_i/w_i}$, wherein $s_{w_i}$ represents a scaling factor for the at least one convolutional kernel or transpose convolution kernel associated with an i-th channel of the neural network model, i being an integer, $W_i$ represents a threshold for the at least one weight of the at least one convolutional kernel or transpose convolution kernel associated with the i-th channel, $w_i$ represents the maximum absolute value of the at least one weight, and // represents an integer division operation.

Clause 48. The method of any of clauses 34-47, further comprising: performing a rescaling process to the output visual data of the neural network model; and adding a bias of a convolution layer or a transpose convolution layer of the neural network model to the rescaled output visual data without quantizing the bias.

Clause 49. The method of any of clauses 34-47, further comprising: performing a quantization process to a bias of a convolution layer or a transpose convolution layer of the neural network model based on a scaling factor, the scaling factor being applied to a weight of the convolution layer or the transpose convolution layer.

Clause 50. The method of any of clauses 34-49, further comprising: determining value change information of a reference dataset, the value change information indicating a change of the reference dataset inside the neural network model; and determining, based on the value change information, a scaling factor of the scaling process to be applied to input visual data of the neural network model.

Clause 51. The method of clause 50, wherein a number of samples in the reference dataset is smaller than a threshold number.

Clause 52. The method of clause 50 or clause 51, wherein the value change information comprises a maximum absolute value of the input visual data, and the scaling factor is determined by using the following: $s_d=V/v$, wherein $s_d$ represents the scaling factor, V represents a threshold for the input visual data, and v represents the maximum absolute value of the input visual data.

Clause 53. The method of clause 50, wherein a number of samples in the reference dataset is larger than or equal to a threshold number.

Clause 54. The method of any of clauses 34-49, further comprising: obtaining a plurality of reference datasets; determining a plurality of value change information of the plurality of reference datasets inside the neural network model; and determining, based on the plurality of value change information, a plurality of scaling factors of the scaling process for a plurality of sets of visual data.

Clause 55. The method of clause 54, further comprising: including a scaling factor flag in the bitstream, the scaling factor flag indicating one of the plurality of scaling factors to be applied in the scaling process.

Clause 56. The method of clause 54, further comprising: selecting, based on an additional model or latent information of the neural network model, a scaling factor from the plurality of scaling factors to be applied in the scaling process.

Clause 57. The method of any of clauses 34-56, wherein at least one weight of a convolution layer or a transpose convolution layer C of the neural network model is scaled and quantized based on the following: $\hat{C}_i=round(C_i \times s_{w_i})$, wherein $C_i$ represents a group of convolution kernel weights associated with an i-th channel of the neural network model, i being an integer, $s_{w_i}$ represents a scaling factor for the group of convolution kernel weights associated with the i-th channel, $\hat{C}_i$ represents a group of quantized weights, and round( ) represents a rounding operation.

Clause 58. The method of any of clauses 34-57, wherein the input visual data of the neural network model is scaled and quantized based on the following: $\hat{D}=round(D \times s_d)$, wherein D represents the input visual data, $s_d$ represent the scaling factor, $\hat{D}$ represents the quantized input visual data, and round( ) represents a rounding operation.

Clause 59. The method of any of clauses 34-58, further comprising: performing a clipping operation on scaled input visual data.

Clause 60. The method of clause 59, wherein the clipping operation is one of the following: $\tilde{D}=clip (\hat{D}, 0, V-1)$, or $\tilde{D}=clip (\hat{D},-V/2, V/2-1)$, wherein $\hat{D}$ represents the scaled input visual data, V represents a threshold for the input visual data, $\tilde{D}$ represents the clipped scaled input visual data, and clip (A, B, C) represents a clipping operation for clamping elements in A into a range from B to C.

Clause 61. The method of any of clauses 34-60, further comprising: performing a dequantization process by rescaling output visual data of a quantized layer of the neural network model.

Clause 62. The method of clause 61, wherein the output visual data is rescaled by using the following: $\hat{O}=O/(s_w \times s_d)$, wherein O represents output visual data of a convolution layer or a transpose convolution layer of the neural network model, $s_w$ represents a scaling factor for a weight of the convolution layer or transpose convolution layer, $s_d$ represents a scaling factor for input visual data of the neural network model, and $\hat{O}$ represents the rescaled output visual data.

Clause 63. The method of clause 61, wherein the output visual data is rescaled by using the following: $\hat{O}=O/s_d$, wherein O represents output visual data of an activation layer of the neural network model, $s_d$ represents a scaling factor for the input visual data of the neural network model, and $\hat{O}$ represents the rescaled output visual data.

Clause 64. The method of any of clauses 34-63, further comprising: determining a scaling factor of the scaling process based on a maximum value of visual data during an encoding process.

Clause 65. The method of clause 64, wherein the scaling factor is independent of the visual data.

Clause 66. The method of clause 64 or clause 65, further comprising: including scaling factor information of the determined scaling factor in the bitstream; and determining a further scaling factor used in a decoding process based on the scaling factor information.

Clause 67. The method of clause 64 or clause 65, wherein determining the further scaling factor comprises: determining a further scaling factor used in a decoding process based on latent information of the neural network model.

Clause 68. The method of any of clauses 34-67, wherein the neural network model comprises a recurrent neural network.

Clause 69. A method for visual data processing, comprising: performing a conversion between visual data and a bitstream of the visual data by using a neural network model, wherein the neural network model is characterized in at least one of the following: a number of channels of a layer of the neural network model being less than a threshold channel number, the neural network model using a rectified linear unit (ReLU), a number of layers of the neural network model being less than a threshold layer number, the neural network model using a group convolution or a group transpose convolution, or a kernel size of the neural network model being less than a threshold kernel size.

Clause 70. The method of clause 69, wherein a kernel of the neural network model is divided into a plurality of kernels with a kernel size less than the threshold kernel size.

Clause 71. The method of clause 69 or clause 70, wherein the neural network model is used in learned image and video compression.

Clause 72. The method of any of clauses 69-71, wherein the neural network model is used in entropy coding during the conversion.

Clause 73. The method of any of clauses 69-72, wherein the neural network model is used in an analysis and synthesis part of the conversion.

Clause 74. The method of any of clauses 69-73, wherein the neural network model is used in combination with a further coding tool.

Clause 75. The method of clause 74, wherein the further coding tool comprises at least one of the following: an image compression tool, a video compression tool, or a neural network tool.

Clause 76. The method of any of clauses 69-75, wherein the neural network model is used as at least one of the following: a neural network-based transformation module during the conversion, a neural network-based prediction module during the conversion, or an in-loop filter during the conversion.

Clause 77. The method of any of clauses 1-76, further comprising: including information regarding learned-based coding during the conversion in the bitstream.

Clause 78. The method of any of clauses 1-77, further comprising: determining information regarding learned-based coding by a decoder associated with the conversion.

Clause 79. The method of clause 77 or clause 78, wherein the information is associated with a quantization process or a scaling process for the conversion.

Clause 80. The method of any of clauses 76-79, wherein the information is included at one of the following: a sequence level, a picture level, a slice level, or a block level.

Clause 81. The method of any of clauses 76-80, wherein the information comprises at least one of the following: a scaling factor of a scaling process for the conversion, a first threshold of input visual data of the neural network model, or a second threshold of a weight of the neural network model.

Clause 82. The method of any of clauses 1-81, wherein a process using a learned-based coding for the conversion depends on coding information.

Clause 83. The method of clause 82, wherein the process comprises at least one of the following: a quantization process, or a scaling process.

Clause 84. The method of clause 82 or clause 83, wherein the coding information comprises at least one of the following: a color format, a color component, a dimension of a picture, a dimension of a slice, a dimension of a block, or an indication in the bitstream.

Clause 85. The method of any of clauses 1-84, wherein the conversion includes encoding the visual data into the bitstream.

Clause 86. The method of any of clauses 1-84, wherein the conversion includes decoding the visual data from the bitstream.

Clause 87. An apparatus for data processing comprising a processor and a non-transitory memory with instructions thereon, wherein the instructions upon execution by the processor, cause the processor to perform a method in accordance with any of clauses 1-86.

Clause 88. A non-transitory computer-readable storage medium storing instructions that cause a processor to perform a method in accordance with any of clauses 1-86.

Clause 89. A non-transitory computer-readable recording medium storing a bitstream of data which is generated by a method performed by an apparatus for data processing, wherein the method comprises: performing a quantization process on a dataset comprising at least one of: input visual data of a neural network model used for generating the bitstream, or a parameter of the neural network model; and generating the bitstream based on the quantization process.

Clause 90. A method for storing a bitstream of data, comprising: performing a quantization process on a dataset comprising at least one of: input visual data of a neural network model used for generating the bitstream, or a parameter of the neural network model; generating the bitstream based on the quantization process; and storing the bitstream in a non-transitory computer-readable recording medium.

Clause 91. A non-transitory computer-readable recording medium storing a bitstream of data which is generated by a method performed by an apparatus for data processing, wherein the method comprises: performing a scaling process on a dataset comprising at least one of: input visual data of a neural network model used for generating the bitstream, a parameter of the neural network model, intermediate visual data of the neural network model, or output visual data of the neural network model; and generating the bitstream based on the scaling process.

Clause 92. A method for storing a bitstream of data, comprising: performing a scaling process on a dataset comprising at least one of: input visual data of a neural network model used for generating the bitstream, a parameter of the neural network model, intermediate visual data of the neural network model, or output visual data of the neural network model; generating the bitstream based on the scaling process; and storing the bitstream in a non-transitory computer-readable recording medium.

Clause 93. A non-transitory computer-readable recording medium storing a bitstream of data which is generated by a method performed by an apparatus for data processing, wherein the method comprises: generating the bitstream by using a neural network model, wherein the neural network model is characterized in at least one of the following: a number of channels of a layer of the neural network model being less than a threshold channel number, the neural network model using a rectified linear unit (ReLU), a number of layers of the neural network model being less than a threshold layer number, the neural network model using a group convolution or a group transpose convolution, or a kernel size of the neural network model being less than a threshold kernel size.

Clause 94. A method for storing a bitstream of data, comprising: generating the bitstream by using a neural network model; and storing the bitstream in a non-transitory computer-readable recording medium, wherein the neural network model is characterized in at least one of the following: a number of channels of a layer of the neural network model being less than a threshold channel number, the neural network model using a rectified linear unit (ReLU), a number of layers of the neural network model being less than a threshold layer number, the neural network model using a group convolution or a group transpose convolution, or a kernel size of the neural network model being less than a threshold kernel size.

Example Device

FIG. 14 illustrates a block diagram of a computing device 1400 in which various embodiments of the present disclosure can be implemented. The computing device 1400 may be implemented as or included in the source device 110 (or the data encoder 114) or the destination device 120 (or the data decoder 124).

It would be appreciated that the computing device 1400 shown in FIG. 14 is merely for purpose of illustration, without suggesting any limitation to the functions and scopes of the embodiments of the present disclosure in any manner.

As shown in FIG. 14, the computing device 1400 includes a general-purpose computing device 1400. The computing device 1400 may at least comprise one or more processors or processing units 1410, a memory 1420, a storage unit 1430, one or more communication units 1440, one or more input devices 1450, and one or more output devices 1460.

In some embodiments, the computing device 1400 may be implemented as any user terminal or server terminal having the computing capability. The server terminal may be a server, a large-scale computing device or the like that is provided by a service provider. The user terminal may for example be any type of mobile terminal, fixed terminal, or portable terminal, including a mobile phone, station, unit, device, multimedia computer, multimedia tablet, Internet node, communicator, desktop computer, laptop computer, notebook computer, netbook computer, tablet computer, personal communication system (PCS) device, personal navigation device, personal digital assistant (PDA), audio/video player, digital camera/video camera, positioning device, television receiver, radio broadcast receiver, E-book device, gaming device, or any combination thereof, including the accessories and peripherals of these devices, or any combination thereof. It would be contemplated that the computing device 1400 can support any type of interface to a user (such as "wearable" circuitry and the like).

The processing unit 1410 may be a physical or virtual processor and can implement various processes based on programs stored in the memory 1420. In a multi-processor system, multiple processing units execute computer executable instructions in parallel so as to improve the parallel processing capability of the computing device 1400. The processing unit 1410 may also be referred to as a central processing unit (CPU), a microprocessor, a controller or a microcontroller.

The computing device 1400 typically includes various computer storage medium. Such medium can be any medium accessible by the computing device 1400, including, but not limited to, volatile and non-volatile medium, or detachable and non-detachable medium. The memory 1420 can be a volatile memory (for example, a register, cache, Random Access Memory (RAM)), a non-volatile memory (such as a Read-Only Memory (ROM), Electrically Erasable Programmable Read-Only Memory (EEPROM), or a flash memory), or any combination thereof. The storage unit 1430 may be any detachable or non-detachable medium and may include a machine-readable medium such as a memory, flash memory drive, magnetic disk or another other media, which can be used for storing information and/or data and can be accessed in the computing device 1400.

The computing device 1400 may further include additional detachable/non-detachable, volatile/non-volatile memory medium. Although not shown in FIG. 14, it is possible to provide a magnetic disk drive for reading from and/or writing into a detachable and non-volatile magnetic disk and an optical disk drive for reading from and/or writing into a detachable non-volatile optical disk. In such cases, each drive may be connected to a bus (not shown) via one or more data medium interfaces.

The communication unit 1440 communicates with a further computing device via the communication medium. In addition, the functions of the components in the computing device 1400 can be implemented by a single computing cluster or multiple computing machines that can communicate via communication connections. Therefore, the computing device 1400 can operate in a networked environment using a logical connection with one or more other servers, networked personal computers (PCs) or further general network nodes.

The input device 1450 may be one or more of a variety of input devices, such as a mouse, keyboard, tracking ball, voice-input device, and the like. The output device 1460 may be one or more of a variety of output devices, such as a display, loudspeaker, printer, and the like. By means of the communication unit 1440, the computing device 1400 can further communicate with one or more external devices (not shown) such as the storage devices and display device, with one or more devices enabling the user to interact with the computing device 1400, or any devices (such as a network card, a modem and the like) enabling the computing device 1400 to communicate with one or more other computing devices, if required. Such communication can be performed via input/output (I/O) interfaces (not shown).

In some embodiments, instead of being integrated in a single device, some or all components of the computing device 1400 may also be arranged in cloud computing architecture. In the cloud computing architecture, the components may be provided remotely and work together to implement the functionalities described in the present disclosure. In some embodiments, cloud computing provides computing, software, data access and storage service, which will not require end users to be aware of the physical locations or configurations of the systems or hardware providing these services. In various embodiments, the cloud computing provides the services via a wide area network (such as Internet) using suitable protocols. For example, a cloud computing provider provides applications over the wide area network, which can be accessed through a web browser or any other computing components. The software or components of the cloud computing architecture and corresponding data may be stored on a server at a remote position. The computing resources in the cloud computing environment may be merged or distributed at locations in a remote data center. Cloud computing infrastructures may provide the services through a shared data center, though they behave as a single access point for the users. Therefore, the cloud computing architectures may be used to provide the components and functionalities described herein from a service provider at a remote location. Alternatively, they may be provided from a conventional server or installed directly or otherwise on a client device.

The computing device 1400 may be used to implement visual data encoding/decoding in embodiments of the present disclosure. The memory 1420 may include one or more visual data coding modules 1425 having one or more program instructions. These modules are accessible and executable by the processing unit 1410 to perform the functionalities of the various embodiments described herein.

In the example embodiments of performing visual data encoding, the input device 1450 may receive visual data as an input 1470 to be encoded. The visual data may be processed, for example, by the visual data coding module 1425, to generate an encoded bitstream. The encoded bitstream may be provided via the output device 1460 as an output 1480.

In the example embodiments of performing visual data decoding, the input device 1450 may receive an encoded bitstream as the input 1470. The encoded bitstream may be processed, for example, by the visual data coding module 1425, to generate decoded visual data. The decoded visual data may be provided via the output device 1460 as the output 1480.

While this disclosure has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting.

We claim:

1. A method for visual data processing, comprising:
performing, for a conversion between visual data and a bitstream of the visual data, a quantization process on a dataset comprising at least one of: input visual data of a neural network model used for the conversion, or a parameter of the neural network model; and
performing the conversion based on the quantization process,
wherein performing the quantization process comprises:
determining at least one threshold for the dataset; and
determining a fix-point representation of the dataset by performing the quantization process based on the at least one threshold,
wherein performing the quantization process comprises:
determining the fix-point representation of the dataset by clipping the dataset based on the at least one threshold.

2. The method of claim 1, wherein performing the quantization process comprises:
obtaining the fix-point representation of the dataset by performing the quantization process on a floating-point representation of the dataset.

3. The method of claim 1, wherein the parameter of the neural network model comprises at least one of the following:
a first parameter associated with a convolution layer or a transpose convolution layer of the neural network model, or
a second parameter associated with an activation metric of the neural network model.

4. The method of claim 3, wherein the first parameter comprises a weight of the convolution layer or the transpose convolution layer of the neural network model,
wherein the first parameter does not comprise a bias of the convolution layer or the transpose convolution layer in floating-point.

5. The method of claim 1, wherein the at least one threshold comprises at least one of:
a first threshold of a value or absolute value of the input visual data of the neural network model, or
a second threshold of a value or absolute value of a weight of the neural network model.

6. The method of claim 5, wherein determining the at least one threshold comprises:
determining the at least one threshold based on a maximum number of bits used in a fix-point operation and a shape of a convolution layer or a transpose convolution layer of the neural network model.

7. The method of claim 6, wherein the at least one threshold is determined based on a first metric as follows:

$$V \times W = 2^{B-1}/(M \times N \times K_H \times K_W),$$

wherein I represents a first threshold of the at least one threshold for the input visual data of the neural network model, W represents a second threshold of the at least one threshold for a weight of the neural network model, B represents the maximum number of bits, M represents a number of input channels of the neural network model, N represents a number of output channels of the neural network model, $K_H$ represents a height of a kernel of the neural network model, and $K_W$ represents a width of the kernel.

8. The method of claim 7, wherein the first and second thresholds are determined by $V=W=\sqrt{2^{B-1}/(M \times N \times K_H \times K_W)}$.

9. The method of claim 6, wherein the at least one threshold is determined based on a second metric as follows:

$$\log_2 V + \log_2 W = B - \text{ceil}(\log_2(M \times N \times K_H \times K_W)) - 1,$$

wherein V represents a first threshold of the at least one threshold for the input visual data of the neural network model, W represents a second threshold of the at least one threshold for a weight of the neural network model, B represents the maximum number of bits, M represents a number of input channels of the neural network model, N represents a number of output channels of the neural network model, $K_H$ represents a height of a kernel of the neural network model, and $K_W$ represents a width of the kernel, and ceil( ) represents a ceiling metric.

10. The method of claim 9, wherein the first and second thresholds are further determined by:
determining a ratio between the first threshold and the second threshold based on statistic average values of the input visual data; and
determining the first and second thresholds based on the ratio and the second metric.

11. The method of claim 9, wherein the first and second thresholds are determined by using $V=W=2^{(B-ceil(log_2(M \times N \times K_H \times K_W))-1)//2}$, // representing an integer division operation.

12. The method of claim 1, wherein determining the at least one threshold comprises:
determining a plurality of thresholds for weights of a plurality of layers of the neural network model;
determining a minimum threshold of the plurality of thresholds; and
determining the minimum threshold as a threshold for weights of the plurality of layers of the neural network model.

13. The method of claim 1, wherein determining the fix-point representation of the dataset comprises:
determining the fix-point representation of the input visual data of the neural network model by clipping the input visual data based on a maximum number of bits,
wherein the maximum number of bits is $\log_2$ V bits, V representing a first threshold of the at least one threshold for the input visual data, and wherein the input visual data is clipped to be in one of the following ranges:

a first range of zero to V−1, or a second range of −V/2 to V/2−1.

14. The method of claim 1, wherein determining the fix-point representation of the dataset comprises:

determining the fix-point representation of a weight of the neural network model by clipping the weight based on a maximum number of bits, wherein the maximum number of bits is $\log_2$ W bits, W representing a second threshold of the at least one threshold for the weight, and wherein the weight is clipped to be in one of the following ranges:

a third range of zero to W−1, or a fourth range of −W/2 to W/2−1.

15. The method of claim 1, wherein the conversion includes encoding the visual data into the bitstream, or wherein the conversion includes decoding the visual data from the bitstream.

16. An apparatus for data processing comprising a processor and a non-transitory memory with instructions thereon, wherein the instructions upon execution by the processor, cause the processor to:

perform, for a conversion between visual data and a bitstream of the visual data, a quantization process on a dataset comprising at least one of: input visual data of a neural network model used for the conversion, or a parameter of the neural network model; and perform the conversion based on the quantization process, wherein performing the quantization process comprises:

determining at least one threshold for the dataset; and determining a fix-point representation of the dataset by performing the quantization process based on the at least one threshold, wherein performing the quantization process comprises:

determining the fix-point representation of the dataset by clipping the dataset based on the at least one threshold.

17. A non-transitory computer-readable storage medium storing instructions that cause a processor to perform a method performed by a data processing apparatus, wherein the method comprises:

performing, for a conversion between visual data and a bitstream of the visual data, a quantization process on a dataset comprising at least one of: input visual data of a neural network model used for the conversion, or a parameter of the neural network model; and performing the conversion based on the quantization process, wherein performing the quantization process comprises:

determining at least one threshold for the dataset; and determining a fix-point representation of the dataset by performing the quantization process based on the at least one threshold, wherein performing the quantization process comprises:

determining the fix-point representation of the dataset by clipping the dataset based on the at least one threshold.

18. A non-transitory computer-readable recording medium storing a bitstream of data which is generated by a method performed by an apparatus for data processing, wherein the method comprises:

performing a quantization process on a dataset comprising at least one of: input visual data of a neural network model used for generating the bitstream, or a parameter of the neural network model; and generating the bitstream based on the quantization process, wherein generating the bitstream based on the quantization process comprises:

determining at least one threshold for the dataset; and determining a fix-point representation of the dataset by performing the quantization process based on the at least one threshold, wherein performing the quantization process comprises:

determining the fix-point representation of the dataset by clipping the dataset based on the at least one threshold.

* * * * *